(12) United States Patent
Kreller

(10) Patent No.: US 9,109,370 B2
(45) Date of Patent: Aug. 18, 2015

(54) SCAFFOLDING POST

(75) Inventor: Helmut Kreller, Bad Rappenau (DE)

(73) Assignee: Wilhelm Layher Verwaltungs-GmbH, Gueglingen-Eibensbach (DE)

( * ) Notice: Subject to any disclaimer, the term of this patent is extended or adjusted under 35 U.S.C. 154(b) by 313 days.

(21) Appl. No.: 13/824,545

(22) PCT Filed: Jan. 9, 2012

(86) PCT No.: PCT/DE2012/100005
§ 371 (c)(1),
(2), (4) Date: Mar. 18, 2013

(87) PCT Pub. No.: WO2012/136198
PCT Pub. Date: Oct. 11, 2012

(65) Prior Publication Data
US 2013/0336709 A1    Dec. 19, 2013

(30) Foreign Application Priority Data

Apr. 5, 2011 (DE) .......................... 10 2011 001 796

(51) Int. Cl.
*E04C 3/00* (2006.01)
*E04G 7/20* (2006.01)
(Continued)

(52) U.S. Cl.
CPC .. *E04G 7/20* (2013.01); *E04G 7/30* (2013.01); *E04G 7/301* (2013.01); *F16B 7/0413* (2013.01); *F16B 7/20* (2013.01); *Y10T 403/4645* (2015.01)

(58) Field of Classification Search
CPC ............. E04G 7/20; E04G 7/30; E04G 7/301; F16B 7/20; F16B 7/0413; Y10T 403/4645
USPC .................................................. 52/848, 849
See application file for complete search history.

(56) References Cited

U.S. PATENT DOCUMENTS 4,044,523 A    8/1977  Layher
(Continued)

FOREIGN PATENT DOCUMENTS

AT        360 733      1/1981
(Continued)

OTHER PUBLICATIONS

International Search Report of PCT/DE2012/100164, Nov. 28, 2012.
(Continued)

*Primary Examiner* — Mark Wendell
*Assistant Examiner* — Keith Minter
(74) *Attorney, Agent, or Firm* — Collard & Roe, P.C.

(57) ABSTRACT

The invention relates to a scaffolding post (25) made of metal, including a tube (26) and a tubular tube connector (27) integrally molded therewith. In a transition region between the tube connector (27) and the tube (26) a stop (46) is formed, the stop being in the form of an annular post-supporting end face (50) running perpendicularly to the longitudinal axis of the scaffolding post (25) and circumferentially around the longitudinal axis. The slide-on area (37) of the tube (26) has a plurality of indentations (86), each extending in the direction of the longitudinal axis of the scaffolding post (25) and each being designed with a tube inner cross-section reduction. The indentations are arranged distributed in the circumferential direction around the longitudinal axis of the scaffolding post (25) at regular intervals or equidistant and each extends continuously for a length in the tube slide-on region (37), starting directly from a tube-supporting end face in the direction of the tube connector (27). The indentations (86) are each configured in an L-shape or T-shape with a longitudinal supporting indentation (90) and a transverse centering indentation (91). In the region of the post-supporting end face (50) the tube connector (27) includes a centering region (65) spanning a first tube connector outside diameter and further includes a supporting region (73) spanning a second tube connector outside diameter, wherein the first tube connector outside diameter is slightly larger than the second tube connector outside diameter. The tube (26) includes a substantially circular cylindrical tube portion (55), which merges in the direction of the free tube connector end directly, substantially sharp-edged via an annular edge or with a slight transitional radius, into the post-supporting surface (50).

20 Claims, 17 Drawing Sheets

Figure 1:
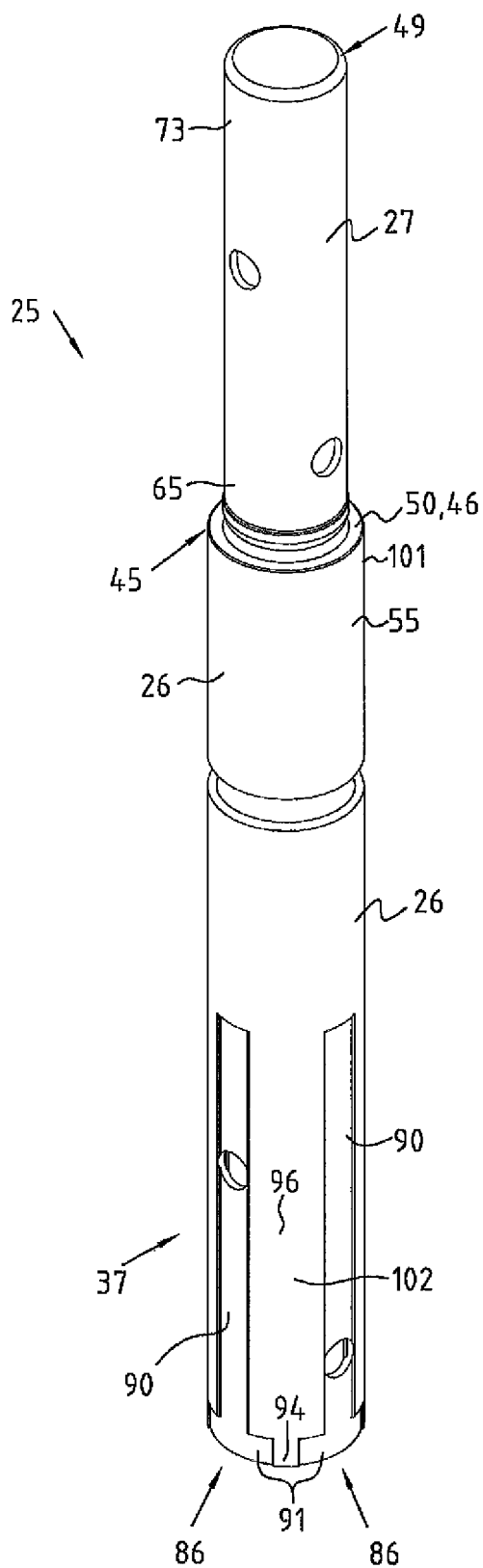

(51) Int. Cl.
  *E04G 7/30* (2006.01)
  *F16B 7/04* (2006.01)
  *F16B 7/20* (2006.01)

(56) References Cited

U.S. PATENT DOCUMENTS

| | | | |
|---|---|---|---|
| 4,530,616 A | | 7/1985 | Roux |
| 4,595,077 A | | 6/1986 | Buttgereit |
| 4,715,474 A | * | 12/1987 | Wehmeyer .................... 182/194 |
| 4,815,249 A | | 3/1989 | Szucs |
| 4,840,513 A | | 6/1989 | Hackett |
| 4,867,274 A | | 9/1989 | Langer |
| 4,958,702 A | | 9/1990 | Langer |
| 5,024,037 A | | 6/1991 | Ono |
| 5,127,757 A | | 7/1992 | Langer |
| 5,207,527 A | | 5/1993 | Duncan et al. |
| 5,217,314 A | | 6/1993 | Perruelle |
| 5,411,113 A | | 5/1995 | Lubinski |
| 5,605,204 A | * | 2/1997 | Ausejo ...................... 182/186.7 |
| 5,868,223 A | | 2/1999 | Lubinski |
| 5,954,921 A | | 9/1999 | Dahmen et al. |
| 5,961,240 A | | 10/1999 | Bobrovniczky |
| 6,027,276 A | | 2/2000 | Schworer |
| 2006/0153631 A1 | | 7/2006 | Stringer |
| 2010/0025556 A1 | * | 2/2010 | Rogers ....................... 248/296.1 |
| 2010/0078263 A1 | | 4/2010 | Kreller |
| 2012/0181111 A1 | | 7/2012 | Brinkmann |
| 2012/0228060 A1 | * | 9/2012 | Rogers ....................... 182/178.5 |
| 2013/0330117 A1 | * | 12/2013 | Kreller ............................ 403/49 |
| 2013/0336709 A1 | * | 12/2013 | Kreller .......................... 403/246 |

FOREIGN PATENT DOCUMENTS

| | | |
|---|---|---|
| CH | 659 282 | 1/1987 |
| CN | 103255910 A | 8/2013 |
| DE | 1 972 690 | 11/1967 |
| DE | 25 23 879 | 12/1975 |
| DE | 24 49 124 | 4/1976 |
| DE | 26 54 439 | 6/1978 |
| DE | 35 46 045 | 6/1987 |
| DE | 38 24 823 | 1/1990 |
| DE | 44 30 069 | 2/1996 |
| DE | 196 30 225 | 1/1997 |
| DE | 195 47 382 | 6/1997 |
| DE | 198 06 093 | 8/1999 |
| DE | 202 00 728 | 4/2002 |
| DE | 101 11 279 | 7/2002 |
| DE | 101 12 370 | 9/2002 |
| DE | 102 25 403 A1 | 3/2003 |
| DE | 202 21 675 | 11/2006 |
| DE | 20 2006 015 586 | 2/2008 |
| EP | 0 004 806 | 10/1979 |
| EP | 0 112 831 | 7/1984 |
| EP | 0 276 487 | 8/1988 |
| EP | 0 351 703 | 1/1990 |
| EP | 0 423 514 | 4/1991 |
| EP | 0 486 381 | 5/1992 |
| EP | 0 780 583 | 6/1997 |
| EP | 0 936 327 | 8/1999 |
| EP | 0 777 804 B1 | 11/1999 |
| EP | 1 219 761 | 7/2002 |
| EP | 1 911 907 | 4/2008 |
| FR | 2 273 220 | 12/1975 |
| FR | 2 520 482 | 7/1983 |
| FR | 2 529 931 | 1/1984 |
| FR | 2 553 456 | 4/1985 |
| FR | 2 752 593 A3 | 2/1998 |
| FR | 2 912 476 | 8/2008 |
| GB | 1 469 807 | 4/1977 |
| GB | 2 061 445 A | 5/1981 |
| GB | 2 165 021 | 4/1986 |
| GB | 2 369 665 | 6/2002 |
| JP | 50-023924 | 3/1975 |
| JP | 10-37455 A | 2/1998 |
| JP | 11-022186 A | 1/1999 |
| JP | 11-050656 A | 2/1999 |
| JP | 11-62213 A | 3/1999 |
| JP | 11-182027 A | 7/1999 |
| JP | 2004-092253 A | 3/2004 |
| JP | 2013-256857 A | 12/2013 |
| WO | WO 83/02637 | 8/1983 |
| WO | WO 94/16172 | 7/1994 |
| WO | WO 97/27372 | 7/1997 |
| WO | WO 02/066768 | 8/2002 |
| WO | WO 2008/043339 | 4/2008 |

OTHER PUBLICATIONS

International Search Report of PCT/DE2012/100163, Nov. 28, 2012.
International Search Report of PCT/DE2012/100005, May 9, 2012.
European Search Report dated Oct. 4, 2012 in European Application No. 12 17 0282 with English translation of relevant parts.
European Search Report dated Jul. 17, 2012 in European Application No. 12 16 8022 with English translation of the relevant parts.
European Search Report dated Jul. 18, 2012 in European Application No. 12 16 8019 with English translation of the relevant parts.
European Search Report dated Jul. 17, 2012 in European Application No. 12 16 8012 with English translation of the relevant parts.
European Examination Report dated Aug. 4, 2014 in European Application No. 12 170 282.3 with English translation of relevant parts.
European Examination Report in 12 170 282.3 dated Mar. 19, 2015, with English translation of relevant parts.
Australian Examination Report in Australian Application No. 2012239235, dated Nov. 7, 2014.
Australian Examination Report in Australian Application No. 2012265293, dated Oct. 31, 2014.
Australian Examination Report in Australian Application No. 2012265292, dated Oct. 31, 2014.

* cited by examiner

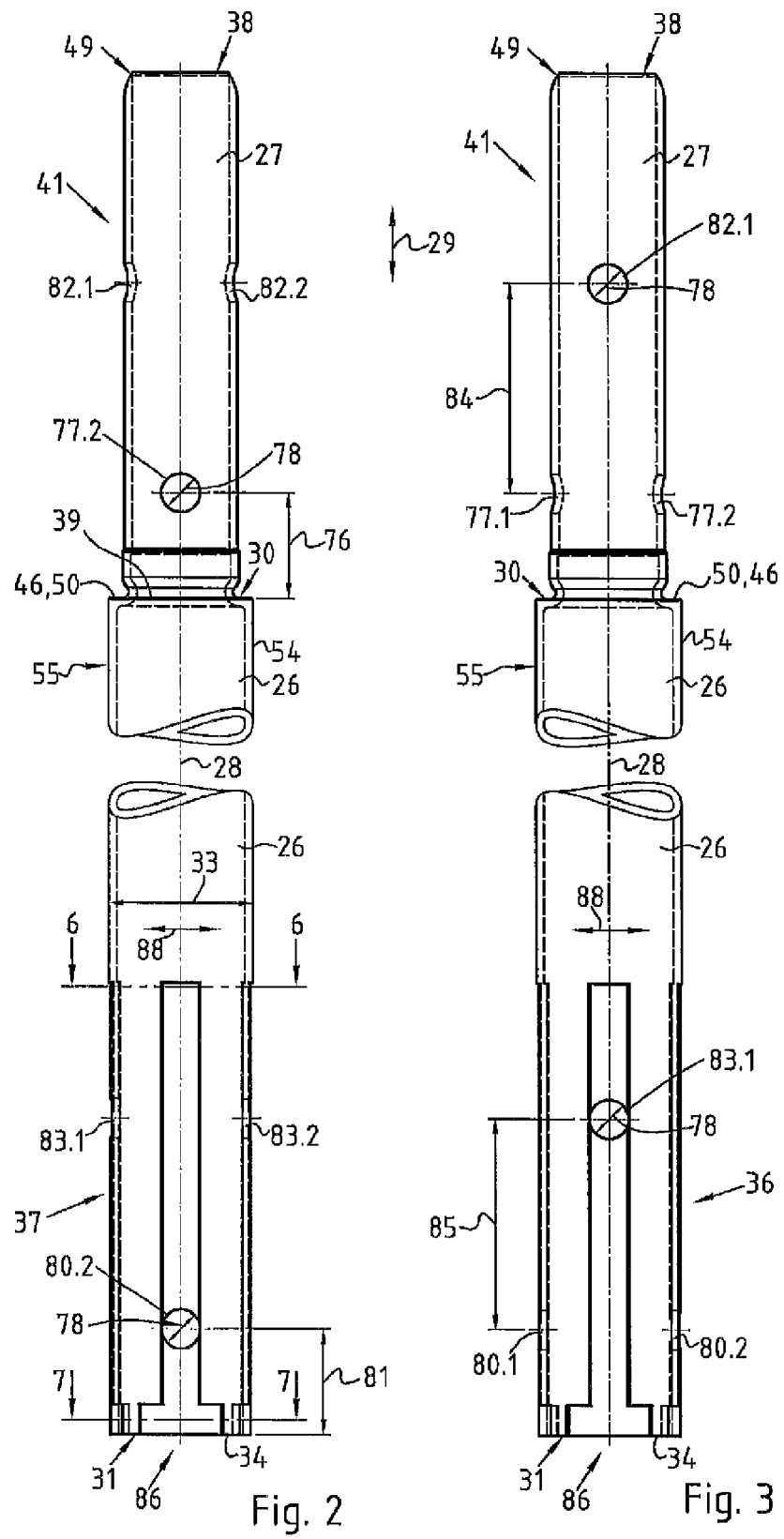

SCAFFOLDING POST

CROSS REFERENCE TO RELATED APPLICATIONS

This application is the National Stage of PCT/DE2012/100005 filed on Jan. 9, 2012, which claims priority under 35 U.S.C. §119 of German Application No. 10 2011 001 796.8 filed on Apr. 5, 2011, the disclosure of which is incorporated by reference. The international application under PCT article 21(2) was not published in English.

The invention relates to a scaffolding post made of metal, preferably of steel, having a tube and a tubular tube connector formed onto it in one piece, which extend, in each instance, in the direction of a longitudinal axis of the scaffolding post and are configured coaxial to the longitudinal axis, particularly whereby the tube and the tube connector are produced in one piece from a round tube, whereby the tube has a first tube end assigned to the tube connector, a free second tube end that faces away from the first, an outside tube diameter, an inside tube diameter, and a tube wall thickness, and whereby the tube, at its free tube end, has a ring-shaped tube support face surface for vertical support of the scaffolding post, preferably on a ring-shaped post set-up face surface of a further scaffolding post, and a tube end section having a length, which section extends, proceeding from the tube support face surface, in the direction of the tube connector, and forms a tube mounting region for mounting the tube onto a tube connector of a further scaffolding post, for example a post according to the invention or a similar or conventional post, and whereby the tube connector has a free first tube connector end, a second tube connector end, and a tube connector length, whereby the tube connector ends delimit a tube connector insertion region for insertion of the tube connector into a tube of a further scaffolding post, for example a post according to the invention or a similar or conventional post, which tube can be mounted or is mounted onto the connector, and whereby the tube mounting region of the tube has a length that essentially corresponds to the length of the tube connector insertion region of the tube connector and/or essentially corresponds to an effective tube connector length, and whereby the tube connector has an outside tube connector diameter, in the tube connector insertion region, that is reduced, as compared with an inside tube diameter of the tube spanned by the tube end section in the tube mounting region of the tube, preferably whereby the tube connector has circular outside cross-sections essentially over its entire tube connector length, the outside diameter of which is equal to or less than the maximal outside tube connector diameter in the tube connector insertion region, and whereby a stop in the form of a ring-shaped post set-up surface that runs perpendicular to the longitudinal axis of the scaffolding post and around the longitudinal axis is configured in a transition region between the tube connector and the tube, so that the further scaffolding post can be mounted or is mounted onto the scaffolding post, all the way to the stop, in releasable manner, with a radial gap or play, preferably of at least approximately 2.5 to 3.5 percent of the outside tube connector diameter and/or of at least approximately 1.0 mm or of at least approximately 1.3 mm, particularly can freely rotate there or also there, relative to the further scaffolding post, about the longitudinal axis of the scaffolding post, and whereby the tube connector furthermore has a tube connector section disposed between the post set-up face surface and the free tube connector end, which section has support surfaces for lateral support of the further scaffolding post that can be mounted or is mounted onto the tube connector, which surfaces are disposed at a distance from the post set-up face surface that corresponds to the effective tube connector length and/or extend all the way to a distance from the post set-up face surface that corresponds to the effective connector length, and whereby the effective tube connector length either essentially corresponds to the tube connector length, or is reduced, in comparison with the tube connector length, by the length of an introduction cross-section narrowing disposed at the free tube connector end, narrowing in the direction of the free tube connector end, which narrowing can be optionally provided, and whereby the tube mounting region of the tube has a number of at least two, preferably at least three indentations that extend in the direction of, preferably parallel to, the longitudinal axis of the scaffolding post, in each instance, which indentations are configured with an inside tube cross-section narrowing, in each instance, and are disposed distributed about the longitudinal axis of the scaffolding post, in the circumference direction, regularly and/or at the same distance, and extend, in the tube mounting region, in each instance, directly proceeding from the tube support face surface, in the direction of the tube connector, continuously over a length that essentially or at least corresponds to the effective tube connector length or the tube mounting length, and amounts to at least three times the maximal outside tube connector diameter and/or at least 150 mm, and whereby the indentations projecting into the interior of the tube in the tube mounting region have inner support surfaces for lateral support of the tube on the tube connector of the further scaffolding post that can be inserted or is inserted into the tube.

Such a scaffolding post has become known, for example, from DE 101 12 370 A1, the parallel WO 02/066768 A1, and the parallel DE 202 21 675 U1 and EP 1 911 907 A1 of the applicant. Such scaffolding posts, also referred to as scaffolding pillars, scaffolding spars, or hollow-profile rods, are used in practice, for example, as integral parts of a scaffolding frame of a frame scaffolding also referred to as system scaffolding. This frame scaffolding has been known for many years also in general as LAYHER SpeedyScaf scaffolding. Such scaffolding posts and the scaffolding frames formed with them are in use in very great numbers.

Other similar scaffolding posts, or posts of the same type, have been usual in scaffolding construction for many decades, including scaffolding posts of a so-called modular scaffolding, also referred to as vertical posts, in which connection elements, for example rosettes, particularly perforated disks, are fastened onto the scaffolding tube, spaced apart from one another in the axial direction, at a grid dimension, in order to be able to connect connection, holding and/or support elements, for example longitudinal bars, transverse bars and/or diagonals there. Such a modular scaffolding has been known for many years as the LAYHER Allround scaffolding system. The posts of this modular scaffolding consist of steel, Grade St37, and have a tube wall thickness of about 3.2 mm.

The spars or posts of the LAYHER SpeedyScaf scaffolding, which are also currently produced from steel, Grade St37, have a reduced wall thickness, in contrast to this, of only about 2.7 mm.

In order to guarantee compatibility and the ability to combine or mix the posts that have different tube wall thickness with one another, with correspondingly good carrying capacity or static characteristic values, it was proposed, according to the documents mentioned initially, to provide the lower end region of the tubes, at least in a certain region, with at least one cross-section narrowing, in such a manner that the permissible or a smaller gap dimension occurs between the inner wall of the lower end region, in the region of the cross-section narrowing, when the hollow-profile rods are mounted on top of or onto one another, and the outside wall of the mounted hollow-profile rod.

In practice, the hollow-profile rods have four equal cross-section narrowings in the form of an indentation, in each instance, which is configured, in each instance, as a longitudinal strip that runs in the longitudinal direction of the hollow-profile rod, whereby these cross-section narrowings are disposed spaced apart from one another, in the circumference direction of the hollow-profile rod, in grid-like manner, at a circumference angle of 90 degrees, in each instance.

According to the documents mentioned initially, the cross-section narrowings discussed there can be structured essentially in the form of the following three alternatives: According to a first alternative, the cross-section narrowing that is configured as an indentation can be configured as a longitudinal strip that runs in the longitudinal direction of the hollow-profile rod, which can be disposed, in the circumference direction of the hollow-profile rod, in grid-like manner, particularly according to a circumference angle of 90, 60, or 45 degrees or less, in each instance. According to a second alternative, the cross-section narrowing can be configured as a circumferential ring-shaped indentation, which is present not only on the upper edge region but also, at a distance from the free tube end, on the lower edge region of the lower end region of the tube. According to a third alternative, the cross-section narrowing can be configured as a point-shaped indentation that again can be disposed not only on the upper edge region, in each instance, but also on the lower edge region of the lower end region, at a distance from the free tube end, circumferentially in a grid of 90, 60, or 45 degrees or less, in each instance.

With the goal of solving the same problem, in other words of aligning lighter tubes with thinner walls, in particular, in combination with previous scaffolding tubes or upright tubes with thicker walls, with sufficient fit precision, good assembly and disassembly ability, well centered and straight, with correspondingly advantageous tipping stability, it was proposed according to DE 101 11 279 A1 or the parallel EP 1 219 761 A2 to provide a cross-section narrowing in the form of a ring embossing running around the longitudinal axis of the tube, at a vertical distance from one another, in each instance, in the end region of the scaffolding tube that can be used for mounting, whereby the lower ring embossing is disposed at a vertical distance from the lower circumferential set-up surface of the scaffolding tube, so that the outer circumference of the tube is maintained in the face-side contact surface, and so that the embossing process can be performed more easily. Fundamentally, however, nose-shaped or rib-shaped embossings, distributed over the circumference, would also be possible, including longitudinal ribs that extend over a certain distance in the axial direction.

From DE 196 30 225 A1, a tube system for use in a scaffolding construction, having at least two tubes connected with one another, has become known, whereby a first end of one of the tubes is pushed, with play, into a second end of another one of the tubes. For this purpose, each tube has a mounting cuff on its lower mounting end, having a diameter that is elongated as compared with the tube diameter at the other tube end. Longitudinal ribs that project outward and extend in the axial direction are provided on the tube outside of the upper tube end, in each instance, distributed over the circumference at equal circumference angles of 90 degrees. In order to secure the two tubes reciprocally relative to one another, there are L-shaped protuberances that project inward, situated on the inside of the elongated wall, which protuberances are also disposed distributed over the circumference at equal circumference angles of 90 degrees. The longitudinal ribs and the L-shaped protuberances together form a bayonet-like connection.

A connection device for elongated scaffolding elements of a construction scaffolding for connecting an end of a first scaffolding element with an end of a second scaffolding element, in an abutting arrangement, is evident from WO 83/02637 A, the parallel CH 659 282 A5, and the parallel EP 0 112 831 B1. In order to create a connection device that is stable and, at the same time, easy to set up and to take down, the connection surfaces are dimensioned in such a manner that an interstice is present between them, and that only one of the connection surfaces has at least one group of at least three parts that are located peripherally and symmetrically, and lie opposite one another radially, which parts project from the connection surface and form force-transferring support parts for the opposite connection surface, which parts are located at a predetermined reciprocal distance and furthermore in such a manner that the female component has an essentially sleeve-shaped insertion end and fixes the male component in place in such a manner that the interstice essentially around the entire connection surface of the male component is uniform. In concrete terms, embodiments are disclosed in which a sleeve or a lower tube end is provided with elongated oval, local imprints distributed over the circumference at the same circumference distances, which are disposed in two circumference groups having a vertical distance from one another, of imprints configured in the same manner, in each instance. Another embodiment variant is also disclosed, in which only an arrangement of such imprints, distributed over the circumference, is provided at a relatively great distance from the free tube end, which forms a female component, while the journal-like male component inserted there, projecting beyond a contact surface, narrows conically in the direction of the free insertion end of the journal. In this connection, a ring gap is configured between the ring-shaped inside tube edge present on the free mounting end of the tube standing on the contact surface and the journal that lies in each instance, directly opposite. Furthermore, a local gap is configured between the inner surfaces of the local imprints disposed at a vertical distance from the free tube end, which surfaces project into the interior of the tube, and the journal that lies directly opposite, which gap is equal in size to the ring gap, so that at these locations, only a corresponding slight play or equal size is possible between the tube and the journal.

An apparatus for connecting two tubular elements and correspondingly produced scaffolding parts with a prefinished frame has become known from EP 0 004 806 A1 or the parallel AT-PS 360 733. A first tube and a second tube are configured to be assembled to one another. At the lower end of a male tube component, three longitudinally directed grooves are provided at equal circumference angles from one another, which grooves are formed by a change in shape of the tube that is directed inward, disposed at the same circumference angles relative to one another, and extend continuously all the way to the lower end of this tube. Corresponding to this, three longitudinally directed grooves are once again provided at the upper end of a female component, also at the same circumference angles relative to one another, which grooves are also formed by a change in shape of the tube that is directed inward, but are disposed at a vertical distance from the upper tube end of this tube. After the two tube ends have been inserted into one another, all the way up to an inner stop of the lower tube formed by a change in shape directed inward, a shape-fit, stable, essentially play-free and torque-proof tube connection is obtained. Over the course of time, difficulties in assembly and release of the tube connection can come about, for example due to contaminants on the connection surfaces. Also, assembly of the two tubes is only possible at very specific angles relative to one another.

A similar tube connection with the same disadvantages has become known from GB 1 469 807 A and the parallel FR 2 273 220 A and the parallel DE 25 23 879.

A coupling for connecting rod-shaped parts has become known from DE 195 47 382 A1 or the parallel EP 0 780 583 A1. In this connection, a first, male connection element having a mandrel that is cylindrical in cross-section, and a second, female connection element in the form of a tube having a cylindrical recess are provided. The outside diameter of the front region of the mandrel is significantly smaller than the inside diameter of the recess, while the outside diameter of the rear region of the mandrel approximately corresponds to the diameter of the recess. A cone-like intermediate piece is provided between the front region and the rear region of the mandrel. The front insertion end of the mandrel is configured to be narrowed in cone-like manner. A separately circumferential inner ring is fastened into the recess of the tube that forms the female connection element, on its inner circumference, the outside diameter of which ring approximately corresponds to the inside diameter of the recess, and the inside diameter of which ring approximately corresponds to the outside diameter of the front region of the mandrel. This inner ring is disposed at a distance from the front edge of the female connection element, in such a manner that after completion of the coupling process, it encloses the front region of the mandrel. In the coupled, inserted state, a relatively narrow clearance of equal dimensions is provided, in each instance, not only between the inner surface of the inner ring and the corresponding outer surface of the front region of the mandrel, but also between the inner surface of the tube, at its front end, and the corresponding outer surface of the rear region of the mandrel. At this coupling, transfer of a bending moment from one connection element to the other connection element takes place at the contact surfaces, which have tight tolerances and are formed by the rear region of the mandrel and of the recess, on the one hand, and by the front region of the mandrel and the ring inserted into the recess, on the other hand, specifically by means of surface pressure of the pressure forces from the resulting pair of forces, distributed over the circumference.

A method for the production of a construction scaffolding tube has become known from DE 44 30 069 A1, which tube has an insertion journal formed on, by cold forming, at one end, reduced in diameter, and has a ring-shaped contact surface for support of a tube mounted onto the journal, running essentially perpendicular to the tube axis, in the transition region between the tube and the journal, in which method the tube is first reduced in diameter, to form the journal, over the length of the journal, and subsequently, the transition region is swaged in the axial direction of the tube, to form the contact surface. In order to be able to work without drawing oil, with simple and wear-resistant drawing tools, the diameter reduction in the region of the journal is undertaken with a multi-jaw tool that has multiple pressing jaws that can be set radially toward one another, and swaging of the transition region takes place with a ring-shaped pressing punch that can be pushed axially over the mandrel and with axial support of the transition region in a ring-shaped support mold, the inside diameter of which approximately corresponds to the outside diameter of the tube. In this connection, a scaffolding tube is obtained in which a tube connector having a reduced outside diameter is formed, in one piece, onto a tube having an original outside diameter. When using this method, the formation of a comparatively great transition radius necessarily occurs between the contact surface and the tube. As a result of this, the ring-shaped contact surface is decreased accordingly. This is prevented there in that the diameter reduction of the tube connector is comparatively great, so that the formation of an outside tube connector diameter that is clearly less than the inside diameter of the tube comes about. As a result, in turn, formation of an accordingly larger radial gap or play between the tube connector of the first scaffolding tube and the tube of the second scaffolding tube that is mounted on the first comes about when two scaffolding tubes produced in such a manner are assembled. As a result, comparatively great tilting angles and low carrying capacity come about.

It has become known from DE 35 46 045 A1 to press a separate tube connector into the upper tube end of a scaffolding tube with an outside diameter that is reduced from the start. In this case, this tube end forms a ring-shaped contact surface for support of a tube mounted onto the tube connector.

In DE 26 54 439 A (FIG. 1), as well, a tube connector is pressed into a tube end of a tube, as a separate tube part, with an outside diameter that is reduced from the start. This is done in such a manner that local notches distributed uniformly over the tube circumference are provided in the mounting region, in which the tube connector inserted into the tube overlaps the tube end, which notches lead to slight shape fit with the outer wall of the tube connector. Similar fastening of a separate tube connector tube to a tube is also provided in the case of the scaffolding posts of the LAYHER Allround scaffolding system that is generally known from practice, whereby local imprints on the tube end are undertaken in such a manner that the wall of the tube connector inserted there is deformed to a clearly greater extent, specifically with the formation of a local inside cross-section narrowing of the tube connector. In this way, clearly improved shape fit and correspondingly better connection strength between the tube and the tube connector are achieved.

In the assembled state of such scaffolding posts with pressed-in tube connectors, a comparatively great radial gap or comparatively great radial play is present between the tube connector of the one scaffolding post and the tube end section of the other scaffolding post that is mounted on, so that there, accordingly great radial or lateral offset of the scaffolding posts assembled onto one another comes about. Aside from the fact that this offset means a reduced contact surface, accompanied by a correspondingly reduced transfer of force and carrying capacity, correspondingly increased torques and cants at the connection points can occur on these scaffolding posts, under bending stress, and, as a result, comparatively rapid wear of the connection parts that rub on one another can occur. Furthermore, in the case of these scaffolding posts, for the above reasons, the pressed-in tube connectors must have a comparatively great tube connector length, with which they project outward beyond the tube, in order to limit the tilting angle and to achieve the required carrying capacities. As a result, and due to the section of the tube connector that is inserted into the tube, this connector or the scaffolding posts provided with such a tube connector has/have a correspondingly great weight. In order to be able to achieve the required static characteristic values at the material strengths of the steel tubes that have been available until now, these scaffolding posts must be structured with a comparatively great wall thickness of about 3.2 mm to 4.1 mm. This additionally leads to an accordingly clearly increased material expenditure and to accordingly increased costs of such scaffolding posts.

It has furthermore become generally known to insert a tube connector with an outside diameter that is reduced right from the start into the tube end of a scaffolding tube of a vertical frame as a separate component, and to fix it in place there by means of screws. This method of connection and fastening of the tube connector frequently does not satisfy the static requirements, among other things, and the installation effort is great.

Furthermore, it has become known from DE 26 54 439 A, for example, to produce tube connectors that are reduced in diameter in that first, the tube end is reduced in diameter over the length of the tube connector, by means of cold-forming, and that subsequently, the transition region between the tube connector and the tube is swaged in the axial direction of the tube, to form the contact surface. In this connection, a surface curved toward the outside, in the form of a ring bead that protrudes toward the outside and projects radially beyond the tube is formed, which bead then forms the contact surface, and the outside diameter of which is accordingly greater than the outside diameter of the tube. Scaffolding tubes having such a bead have also already been described in the documents of the applicant mentioned initially, and have also become known from DE 1 972 690 U, DE 20 2006 015 586 U1, and the parallel intellectual property right applications, for example WO 2008/043339 A1 and US 2010 0078 263 A1, as well as from the equivalent EP 1 911 907 A1 of the applicant.

Although such scaffolding tubes configured with a bead at the transition from the tube to the tube connector have certainly proven themselves in practice for many decades, and although they have a lower weight in comparison with scaffolding tubes having tube connectors that are inserted and fixed in place by means of being pressed in or with screws, they are not free of disadvantages. For example, such a bead can make the installation of toe boards more difficult, or their installation might only be possible after deformation of the bead; such toe boards must be put in place to prevent objects from falling off to the side from decking supported on the scaffolding tube. Furthermore, such a bead can prevent welding on of fittings in the transition region between the formed-on contact surface and the tube, and can also impair stackability of the scaffolding tubes or of scaffolding frames provided with them. Furthermore, if such a bead is present, pushing circumferential connection elements such as rosettes or perforated disks onto the scaffolding tube for the purpose of fastening them onto the scaffolding tube is only possible from the free tube end of the tube, and also only up to the bead. This can be connected with disadvantages in the installation and in the production of scaffolding tubes to be provided with such connection elements. Finally, due to the shape and configuration of the swaged bead, the scaffolding tubes formed with it are less rigid in the transition region to their tube connector than the scaffolding tubes having pressed-in tube connectors.

Aside from such scaffolding posts that are provided with a radially projecting bead at the transition between the tube and the tube connector, an embodiment variant has become known, for example from FR 2 529 931 A, in which a separate tube connector is inserted into the tube end of a tube and fastened in place there by means of welding or using other means that are not specified in detail. A further embodiment variant is also evident from this document, in which the tube connector is formed onto the tube, but with the formation of a slanted set-up surface for a mountable scaffolding post, as well as with the formation of a comparatively large radius at the transition from the tube to the set-up surface. In this way, only a limited carrying capacity can be achieved, and there is a risk of canting of and/or damage to the mounted scaffolding post.

A scaffolding tube connector and a scaffolding have become known from DE 202 00 728 U1. A tube is narrowed, at its upper tube end, by means of pressing and embossing, to form a mounting element, which is a tube connector. Its outside diameter corresponds to the inside diameter of the tube. A widened region with a conical slanted surface is formed at the transition between the tube having a nominal outside diameter and the tube connector. This surface extends at an angle relative to the longitudinal axis of the tube, which angle amounts to 35 degrees or 45 degrees. The lower end of the next mounted tube is additionally centered by means of the conical slanted surface. No or at most a negligible notch effect occurs at the transition from the tube to the conical slanted surface, because the transition does not have a sharp edge but rather is gentle. Accordingly, the said transition is provided with a comparatively large transition radius. The tube connector, viewed in the direction of its insertion end, has an essentially circular-cylindrical first tube section that extends over a first length, in the longitudinal direction, directly following the transition formed with the conical slanted surface. Furthermore, the tube connector has an essentially circular-cylindrical second tube section in the region of its insertion end, which section extends over a second length in the longitudinal direction. This end-side second tube section of the tube connector has the same outside diameter as the first tube section of the tube connector close to the transition. A center region of the tube connector is provided between the first tube section and the second tube section, which section is set back slightly or is additionally narrowed, and which extends over half the length of the tube connector. In this way, particularly good guidance is supposed to occur not only in the end region but also in the region of the tube connector close to the transition. Because of the conical slanted surface, the formation of very significant stress peaks occurs in the set-up region when correspondingly structured scaffolding tubes are mounted onto one another, with the result of accordingly low static characteristic values.

Although scaffolding posts that can be assembled to construct scaffolding have been known for many decades, in a decidedly large number of the most varied embodiments and applications, it has been shown, in extensive practical experiments, that very significant technical and economic advantages can surprisingly be achieved by means of specific detail improvements, as compared with the previous scaffolding posts.

It is a task of the invention to make available a scaffolding post which demonstrates better static characteristic values at comparatively low weight and advantageous production, transport, and storage possibilities, advantageous installation and fastening possibilities for connection and/or fastening and/or support elements to be fastened to it, as well as advantageous combination possibilities with previous scaffolding posts, even those having a greater tube wall thickness.

This task is accomplished by the characteristics described herein, particularly in that the indentations, in each instance, are structured in L shape or T shape, or as L indentations or as T indentations, with a longitudinal support indentation for lateral support on the or of the tube connector of the further scaffolding post that can be inserted or has been inserted into the tube, and with a transverse centering indentation for centering relative to the tube connector of the further scaffolding post that can be inserted or has been inserted into the tube, and whereby the longitudinal support indentation and the transverse centering indentation are configured with an inside tube cross-section narrowing, in each instance, and that the transverse centering indentation extends continuously around the longitudinal axis of the scaffolding post, transverse, preferably perpendicular, to the longitudinal support indentation, in the circumference direction, projecting laterally beyond the indentation in the circumference direction, and that the transverse centering indentation is disposed, preferably only at the free tube end, and delimited there by a ring section surface or partial ring surface of the tube support face surface, and that the tube connector, in the region of or adjacent to the post set-up face surface, has a centering region that spans a first outside tube connector diameter, for centering of the tube of the further scaffolding post that can be mounted or is mounted onto the tube connector, and that the tube connector furthermore has a support region for lateral support of the tube of the further scaffolding post that can be mounted or is mounted onto the tube connector, which region follows the centering region, preferably directly, in the direction of the free tube connector end, is disposed within the tube connector section, contains the support surfaces, and spans a second outside tube connector diameter, and that the first outside tube connector diameter is slightly greater than the second outside tube connector diameter, or that the indentations, in each instance, are structured in L shape or T shape, or as L indentations or as T indentations, with a longitudinal support indentation for lateral support on the or of the tube connector of the further scaffolding post that can be inserted or is inserted into the tube, or the tube connector of the further scaffolding post, and with a transverse centering indentation for centering relative to the tube connector of the further scaffolding post that can be inserted or is inserted into the tube, and whereby the longitudinal support indentation and the transverse centering indentation are configured with an inside tube cross-section narrowing, in each instance, and that the transverse centering indentation extends continuously, in the circumference direction, around the longitudinal axis of the scaffolding post, transverse, preferably perpendicular, to the longitudinal support indentation, projecting beyond it laterally in the circumference direction, and that the transverse centering indentation is disposed preferably only at the free tube end and delimited there by a ring section surface or partial ring surface of the tube support face surface, and that the tube has an essentially circular-cylindrical tube section in the region of its first tube end, which section has an outside tube diameter that essentially corresponds to the maximal outside tube diameter spanned by the tube end section or that corresponds to the outside tube diameter of the original round tube, and makes a transition into the post set-up support surface, in the direction of the free tube connector end, directly, either essentially with a sharp edge, by way of a ring-shaped edge, or rounded at a slight transition radius, or that the tube connector, in the region of or adjacent to the post set-up surface, has a centering region that spans a first outside tube connector diameter, for centering of the tube of the further scaffolding post that can be mounted or is mounted onto the tube connector, and that the tube connector furthermore has a support region for lateral support of the tube of the further scaffolding component that can be mounted or is mounted onto the tube connector, which region follows the centering region, preferably directly, in the direction of the free tube connector end, is disposed within the tube connector section, contains the support surfaces, and spans a second outside tube connector diameter, and that the first outside tube connector diameter is slightly greater than the second outside tube connector diameter, and that the tube has an essentially circular-cylindrical tube section in the region of its first tube end, which section has an outside tube diameter that essentially corresponds to the maximal outside tube diameter spanned by the tube end section or essentially corresponds to the outside tube diameter of the original round tube, and makes a transition into the post set-up support surface, in the direction of the free tube connector end, directly, either essentially with a sharp edge, by way of a ring-shaped edge, or rounded at a slight transition radius, or that the indentations, in each instance, are structured in L shape or T shape, or as L indentations or as T indentations, with a longitudinal support indentation for lateral support on the tube connector of the further scaffolding post that can be inserted or is inserted into the tube, and with a transverse centering indentation for centering relative to the tube connector of the further scaffolding post that can be inserted or is inserted into the tube, and whereby the longitudinal support indentation and the transverse centering indentation are configured with an inside tube cross-section narrowing, in each instance, and that the transverse centering indentation extends continuously around the longitudinal axis of the scaffolding post, transverse, preferably perpendicular, to the longitudinal support indentation, in the circumference direction, projecting laterally beyond the indentation in the circumference direction, and that the transverse centering indentation is disposed preferably only at the free tube end and delimited there by a ring section surface or partial ring surface of the tube support face surface, and that the tube connector, in the region of or adjacent to the post set-up surface, has a centering region that spans a first outside tube connector diameter, for centering of the tube of the further scaffolding post that can be mounted or is mounted onto the tube connector, and that the tube connector furthermore has a support region for lateral support of the tube of the further scaffolding post that can be mounted or is mounted onto the tube connector, which region follows the centering region, preferably directly, in the direction of the free tube connector end, is disposed within the tube connector section, contains the support surfaces, and spans a second outside tube connector diameter, and that the first outside tube connector diameter is slightly greater than the second outside tube connector diameter, and that the tube has an essentially circular-cylindrical tube section in the region of its first tube end, which section has an outside tube diameter that essentially corresponds to the maximal outside tube diameter spanned by the tube end section or corresponds to the outside tube diameter of the original round tube, and makes a transition into the post set-up support surface, in the direction of the free tube connector end, directly, either essentially with a sharp edge, by way of a ring-shaped edge, or rounded at a slight transition radius.

If the said tube section or its outside tube diameter makes a transition into the post set-up support surface, in the direction of the free tube connector end, directly, either essentially with a sharp edge, by way of a ring-shaped edge, or rounded at a slight transition radius, in both cases the post set-up face surface makes a transition into this tube section, essentially without a bead or essentially without a bead that projects radially beyond the outside tube diameter of the tube section of the tube that follows the post set-up face surface in the direction of the free tube end, and with a comparatively sharp edge or with a slight radius. Viewed vice versa, the said tube section therefore makes a transition into the post set-up face surface, essentially without a bead or essentially without a bead that projects radially beyond its outside tube diameter, and with a comparatively sharp edge or with a slight radius.

Because of the fact that or when the indentations are structured in T shape or L shape, in each instance, with a longitudinal support indentation for lateral support of the tube connector of the further scaffolding post that can be inserted or is inserted into the tube, and with a transverse centering indentation for centering of the tube connector of the further scaffolding post that can be inserted or is inserted into the tube, whereby the longitudinal support indentation and the transverse centering indentation are configured with an inside tube cross-section narrowing, in each instance, and whereby the transverse centering indentation extends continuously, in the circumference direction, around the longitudinal axis of the scaffolding post, transverse, preferably perpendicular to the longitudinal support indentation, projecting laterally beyond it, and whereby the transverse centering indentation is disposed preferably only at the free tube end and delimited there by a ring section surface of the tube support face surface, particularly advantageous centering possibilities occur, or particularly advantageous centering of the tube mounted onto the tube connector of a further scaffolding post, particularly a post that is the same or of the same type or conventional, with regard to this further scaffolding post is obtained, with correspondingly better static characteristic values of the scaffolding post according to the invention or in a state in which it is assembled with a further scaffolding post, and furthermore, with even more advantageous fastening possibilities of connection, fastening, or coupling elements in the region of the free tube end directly adjacent to the tube support face surface of the tube of the scaffolding tube according to the invention, and finally, with advantageous possibilities for a reduction in the tube wall thickness of the scaffolding post according to the invention, while maintaining a tube connection having an unchanged outside tube connector diameter as compared with tube connectors of the same type or conventional scaffolding posts, so that good combination possibilities continue to exist in this regard.

Because of the fact that or if the tube connector has a centering region for centering the tube of the further scaffolding post that can be mounted or is mounted onto the tube connector in the region of or adjacent to the post set-up face surface, which region spans a first outside tube connector diameter, and that or if the tube connector furthermore has a support region for lateral support of the tube of the further scaffolding component that can be mounted or is mounted onto the tube connector, which region follows the centering region, preferably directly, in the direction of the free tube connector end, is disposed within the tube connector section, contains the support surfaces, and spans a second outside tube connector diameter, and that or if the first outside tube connector diameter is slightly greater than the second outside tube connector diameter, particularly advantageous centering possibilities, on the one hand, and advantageous support possibilities, on the other hand, as well as, in combination, accordingly further improved static characteristic values are achieved. This is true also and specifically in a set-up state in which the scaffolding post according to the invention is assembled with a further scaffolding post according to the invention or also with a similar or conventional scaffolding post, particularly due to better utilization of the post set-up face surface, thereby allowing a better transfer of the forces that occur to the lower scaffolding post.

Because of the fact that or if the tube has an essentially circular-cylindrical tube section in the region of its first tube end, which section has an outside tube diameter that essentially corresponds to the maximal outside tube diameter spanned by the tube end section or corresponds to the outside tube diameter of the original round tube, and makes a transition into the post set-up support surface, viewed in the direction of the free tube connector end, directly, either essentially with or comparatively with a sharp edge, by way of a ring-shaped edge, or rounded at a slight transition radius, maximization of the post set-up face surface is particularly obtained, so that accordingly improved static characteristic values can be achieved. Furthermore, by means of these measures, it is possible to completely avoid a bead that projects laterally or radially, and this results in a whole number of other advantages. For example, installation of toe boards is facilitated or not hindered, without deformations of wall parts of the scaffolding post being required. Furthermore, as a result of the above measures, welding-on of fittings in the transition region between the formed-on contact surface and the tube is possible without hindrance. Furthermore, as the result of these measures, the scaffolding posts according to the invention can be stored and transported in particularly space-saving and hindrance-free manner, whether individually or installed in other scaffolding components, for example in a scaffolding frame. Furthermore, pushing circumferential connection elements, such as rosettes or perforated disks, onto the scaffolding post is now possible from both ends, without hindrance, thereby allowing simpler and more efficient installation of such connection elements, for example also in that two scaffolding posts not yet provided with such connection elements are assembled, and only then the connection elements are pushed onto the assembled scaffolding posts, in the longitudinal direction, from any desired side, whereby or whereupon the connection elements are positioned at predetermined fastening positions and then fastened in place there, preferably welded, on the scaffolding posts. Finally, by means of the said measures, a scaffolding post is obtained that is clearly more rigid, in the transition region between tube connector and tube, than conventional scaffolding posts, which are provided or produced with laterally projecting beads in the transition region.

Very particularly good centering possibilities and accordingly good static characteristic values can be achieved, according to a preferred exemplary embodiment, in that the transverse centering indentation or the related inside tube cross-section narrowing, proceeding from the tube support face surface in the direction of the tube connector, extends over a length that corresponds to a distance of at least a part of the centering region of the tube connector from the post set-up face surface.

A further improvement in the sense of the above advantages can be achieved in an embodiment in that the length of the transverse centering indentation or of the related inside tube cross-section narrowing amounts to about one-tenth to half of the maximal outside tube diameter in the tube mounting region and/or about 5 mm to 20 mm or about one-sixth to one-fourth of the maximal outside tube diameter in the tube mounting region and/or about 8 mm to 12 mm or about 21 percent of the maximal outside tube diameter in the tube mounting region and/or about 10 mm.

Yet another further improvement in the sense of the above advantages can be achieved, according to a particularly preferred exemplary embodiment, in that the transverse centering indentation or the related inside tube cross-section narrowing extends, in the circumference direction, around the longitudinal axis of the scaffolding post, over a first circumference angle that is greater than the quotient of 360 degrees and twice the number of L-shaped or T-shaped indentations and less than the quotient of 360 degrees and once the number of L-shaped or T-shaped indentations, and that the longitudinal support indentation or the related inside tube cross-section narrowing, in the circumference direction, extends around the longitudinal axis over a smaller second circumference angle, which is about half as great or less than half as great as the first circumference angle, or which corresponds approximately to the quotient of 360 degrees and three times the number of L-shaped or T-shaped indentations.

By means of the above measures, the L-shaped or T-shaped indentations can be produced easily and with comparatively slight forming forces, particularly using a cold-forming process. In this connection, the longitudinal support indentation, in each instance, and the transverse centering indentation, in each instance, can be produced in a single work step. Also, such L-shaped or T-shaped indentations can be produced offset over the circumference, in a single work step.

The above advantages can be further improved, according to a further exemplary embodiment, if the transverse centering indentation or the related inside tube cross-section narrowing is delimited by partially cylindrical, particularly partially circular-cylindrical inner centering surfaces and/or if the longitudinal support indentation or the related inside tube cross-section narrowing is delimited with partially cylindrical, particularly partially circular-cylindrical inner support surfaces.

A further improvement in the sense of the above advantages can be achieved, according to a further exemplary embodiment, in that the transverse centering indentation or the related inside tube cross-section narrowing has an essentially constant length, viewed in the longitudinal direction, essentially in the entire circumference region in which it projects laterally beyond the related longitudinal support indentation in the circumference direction, and/or that the longitudinal support indentation or the related inside tube cross-section narrowing has an essentially constant width, viewed in the circumference direction, essentially over its entire length.

Yet another improvement in the sense of the above advantages can be achieved, in another embodiment, if the T-shaped indentations are configured symmetrical to the longitudinal axis of their longitudinal support indentation, in each instance.

A further improvement in the sense of the above advantages can be achieved, according to a particularly advantageous embodiment variant, in that the centering region of the tube connector is configured as an essentially cylindrical, particularly an essentially circular-cylindrical centering section that extends in the longitudinal direction over a centering length, and/or that the support region of the tube connector is configured as an essentially cylindrical, particularly as an essentially circular-cylindrical support section that extends in the longitudinal direction over a support length.

In this connection, it is furthermore advantageous if, according to one or more further embodiments, the centering length is very much smaller than the support length, and/or if the centering length amounts to about one-eighth to half the first outside tube connector diameter and/or about 5 mm to 20 mm or about one-fifth to one-fourth of the first outside tube connector diameter and/or 6 mm to 10 mm or about 21 percent of the first outside tube connector diameter and/or about 8 mm. This is sufficient for good centering and, at the same time, easy ability for assembly or release is ensured in this way. Furthermore, such a centering section can be produced in particularly simple manner.

According to an advantageous further embodiment, the support length can amount to about 3.5 to 4.5 times the second outside tube connector diameter and/or about 130 mm to 170 mm or about 4 times the second outside tube connector diameter and/or about 150 mm. In this way, the demands made on assembled scaffolding posts in scaffolding construction, with regard to their statics and their safety, can be fulfilled to a particular degree.

The demands concerning ability to easily assemble multiple scaffolding posts and to release them again, and the ability to combine and mix them, as well as the demands concerning the statics of such scaffolding posts, can be fulfilled to a very particular degree, according to a further exemplary embodiment, if the first outside tube connector diameter is greater by about 1 to 4 percent or by about 2 to 3 percent or by about 2.1 percent than the second outside tube connector diameter, and/or if the first outside tube connector diameter amounts to about 38.3 mm to 39.5 mm or about 38.8 mm, and if the second outside tube connector diameter amounts to about 37.7 mm to 38.2 mm or about 38.0 mm.

According to a particularly advantageous further development, it can be provided that the transition region between the post set-up face surface and the cylindrical tube section that follows it in the direction of the free tube end is structured with a transition radius that is equal to or less than 1.5 mm or that is equal to or less than 1.0 mm and/or that is structured as a ring edge rounded with a slight transition radius. In this way, the above advantages can be implemented to a particular degree.

According to a preferred exemplary embodiment, it can be provided that a ring-shaped constriction that runs around the longitudinal axis, preferably in the form of an indentation, is configured between the post set-up face surface and the centering region of the tube connector, directly following the post set-up face surface in the direction of the free tube connector end. Such an indentation can preferably be produced using cold-forming. By means of such a constriction, the post set-up face surface can be further maximized, so that the forces that occur can be transferred even better to a lower scaffolding post. Furthermore, by means of such a constriction, reciprocal jamming of scaffolding posts mounted on one another, due to dirt particles adhering to the active connection surfaces, can be avoided, so that perfect releasability of scaffolding posts mounted onto one another is always guaranteed.

If, according to a preferred further development, the constriction spans a minimal outside diameter that is only slightly less than the first outside tube connector diameter in the centering region of the tube connector, great strength is ensured, nevertheless, in this transition region, while maintaining the above advantages in a transition region, in comparison with a transition without such a constriction.

According to a particularly preferred exemplary embodiment, it can be provided that the centering region of the tube connector directly follows the ring-shaped constriction in the direction of the free tube connector end. In this way, a sufficiently great guide length between the centering region and the effective support region, corresponding to the effective tube connector length, can be achieved.

According to a further development, it can be provided that the effective tube connector length amounts to about 4.0 to 4.5 times the second outside tube connector diameter and/or about 155 mm to 175 mm or about 4.3 times to 4.4 times the second outside tube connector diameter and/or about 165 mm. In this way, the demands made on such scaffolding posts in an assembled or mounted state, with regard to statics and safety, are fulfilled to a particular degree.

The scaffolding post according to the invention can be produced, according to a further embodiment, in particularly simple and cost-advantageous manner, and with particularly advantageous mechanical or static characteristic values, if the L-shaped or T-shaped indentations and/or the post set-up face surface and/or essentially the entire tube connector, in other words including its centering region and its support region, is/are produced by means of cold-forming.

According to a particularly preferred exemplary embodiment of the invention, it can be provided that the tube wall thickness of the tube amounts to about 2.7 mm. The scaffolding post made of steel can preferably have a greater strength than conventional scaffolding posts of Grade St37. In particular if the scaffolding post according to the invention is produced from a round tube having a tube wall thickness of about 2.7 mm, or if the tube wall thickness of the tube of the scaffolding post according to the invention amounts to about 2.7 mm, scaffolding posts are obtained that have a weight reduced by about 2.0 kg as compared with the conventional scaffolding posts having a length of about two meters, which have a wall thickness of 3.2 mm. In this way, decisive advantages in the handling and construction of scaffolding are obtained. Despite the reduced tube wall thickness, these scaffolding posts completely fulfill the demands on the carrying capacity, statics, and safety, because of their increased strength, and, in fact, actually surpass them.

According to a particularly advantageous embodiment, it can be provided that the tube connector and the tube—with the exception of transition and/or end region—are delimited over the entire length of the scaffolding post, toward the outside, by outer surfaces having an essentially circular-cylindrical mantle shape. The outer surfaces of the tube can preferably span the outside diameter of the original round tube, in other words of the round tube not yet deformed to form the tube connector and the indentations.

According to a further development, the scaffolding post according to the invention can either be assembled to at least one further scaffolding post according to the invention, or can be assembled to at least one similar or conventional other scaffolding post, which, in contrast to the scaffolding post according to the invention, has a tube connector having essentially the same outside tube connector diameter, preferably a tube having essentially the same or a greater outside tube diameter, particularly having essentially the same or a greater tube wall thickness, whereby the tube and the tube connector of the other scaffolding post extend in the direction of a longitudinal axis of this other scaffolding post, in each instance, and are disposed coaxial to this longitudinal axis, and whereby a stop for setting up a scaffolding post is configured between the tube connector and the tube of the other scaffolding post that has a greater outside diameter, in comparison with the former. In this manner, scaffolding posts according to the invention can therefore be combined with one another, or at least one scaffolding post according to the invention can be combined or mixed with a similar and/or conventional scaffolding post.

According to a very particularly preferred exemplary embodiment, it can be provided that either when a first scaffolding post according to the invention and a second scaffolding post according to the invention are assembled to one another to a stop or all the way to the stop of one of these two scaffolding posts, a centering gap is configured between the inner support surfaces of the transverse centering indentations or the related inside tube cross-section narrowings of the second scaffolding post and the corresponding outer centering surfaces of the centering region of the tube connector of the first scaffolding post that lie directly opposite, and furthermore, a support gap is configured between the inner support surfaces of the longitudinal support indentations or the related inside tube cross-section narrowings of the second scaffolding post and the corresponding support surfaces of the support region of the tube connector of the first scaffolding post that lies directly opposite, which gap is slightly greater than the centering gap, or that when a scaffolding post according to the invention and the other or another scaffolding post are assembled to one another to a stop or all the way to the stop of one of these two scaffolding posts, a centering gap is configured between the outer centering surfaces of the centering region of the tube connector of the scaffolding post according to the invention and corresponding inner support or centering surfaces of the tube mounting region of the other scaffolding post that lies directly opposite, and furthermore, a support gap is configured between the support surfaces of the support region of the tube connector of the scaffolding post according to the invention and corresponding inner support surfaces of the tube mounting region of the other scaffolding post that lies directly opposite, which gap is slightly greater than the centering gap. In this way, particularly good centering of the scaffolding posts mounted onto one another, relative to one another, can be achieved, with maximization of the usable set-up surface, in each instance, in connection with an accordingly improved transfer of the forces that occur to the lower scaffolding post, in each instance.

Furthermore, as a result, advantageous lateral or radial support of the scaffolding posts relative to one another can also be achieved, so that accordingly, tilting or a slanted position of the scaffolding posts relative to one another is minimized. At the same time, it can still be ensured, in this way, that the scaffolding posts can be assembled simply and easily, and also can be released again simply and easily.

A further improvement in the sense of the above advantages can be achieved, according to a preferred embodiment variant, in that the centering gap is smaller by about 15 to 40 percent and/or by about 0.6 mm to 1.0 mm or by about 25 to 30 percent and/or by about 0.8 mm than the support gap.

Yet another improvement in the sense of the above advantages can be achieved, according to a preferred further development, in that the centering gap amounts to between about 4 and 9 percent of the first outside tube connector diameter and/or between about 1.7 mm and 3.3 mm or between about 5 and 8 percent of the first outside tube connector diameter and/or between about 2.1 mm and 3.1 mm or about 5.4 percent of the first outside tube connector diameter and/or about 2.1 mm and/or that the support gap amounts to between about 6 and 12 percent of the second outside tube connector diameter and/or between about 2.5 mm and 4.3 mm or between about 7.5 and 10.5 percent of the second outside tube connector diameter and/or between about 2.9 mm and 3.9 mm or about 7.6 percent of the second outside tube connector diameter and/or about 2.9 mm.

The scaffolding post according to the invention can advantageously form an integral part of a scaffolding frame and/or of a scaffolding, particularly of a modular scaffolding or a frame scaffolding. Accordingly, the invention also relates to a scaffolding frame having at least one scaffolding post according to the invention, preferably having multiple such scaffolding posts. Furthermore, the invention also relates to a scaffolding, particularly a system scaffolding, preferably a frame scaffolding or a modular scaffolding, having at least one scaffolding post according to the invention, preferably having multiple such scaffolding posts.

It is understood that the above characteristics and measures can be combined in any desired manner within the scope of implementability.

Further characteristics, advantages, and aspects of the invention can be derived from the following description part, in which advantageous exemplary embodiments of the invention are described using the figures. According to the invention, the characteristics that can be derived from the description and the drawings can be combined as desired, individually or in a plurality.

Figure 4:
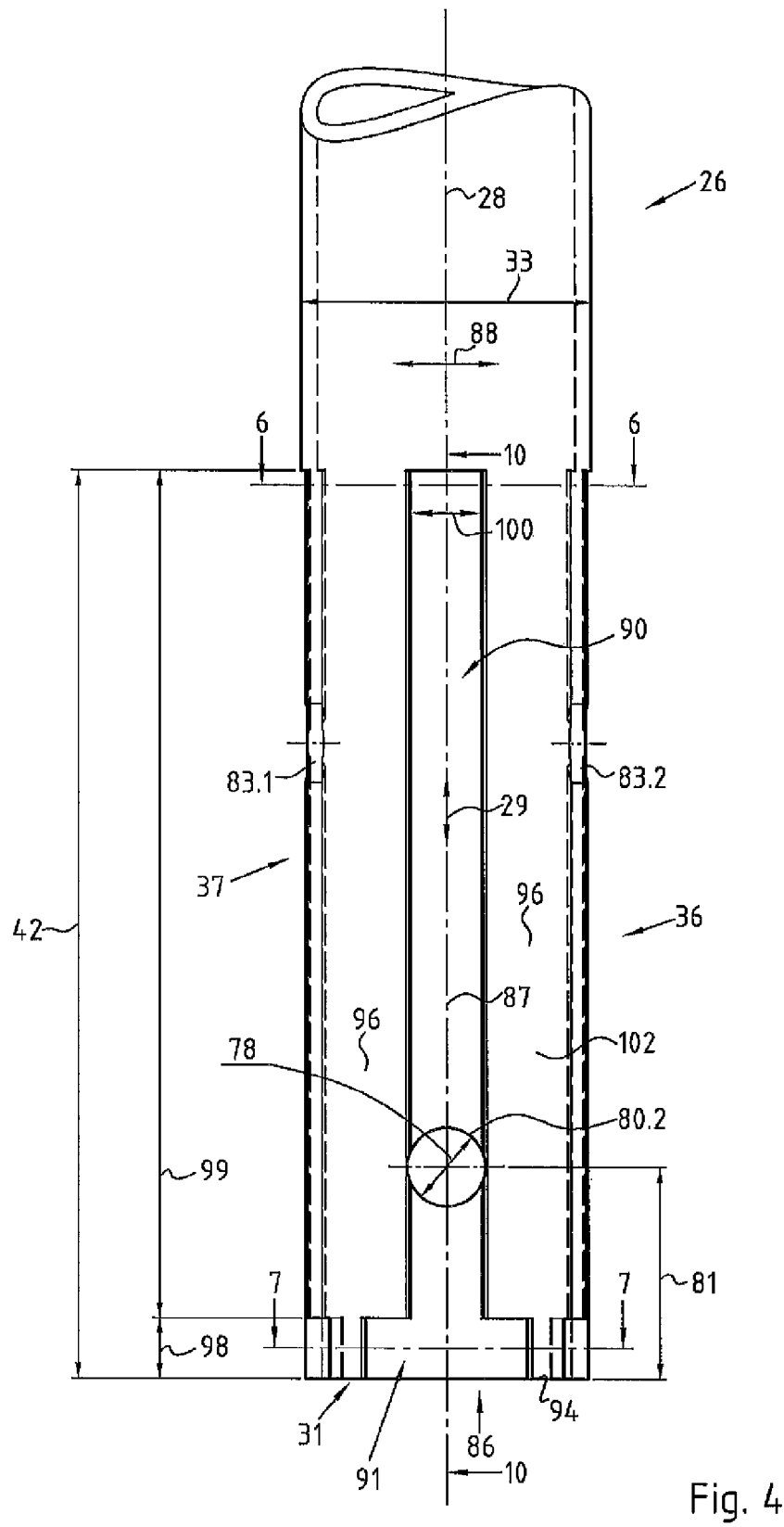
Figure 5:
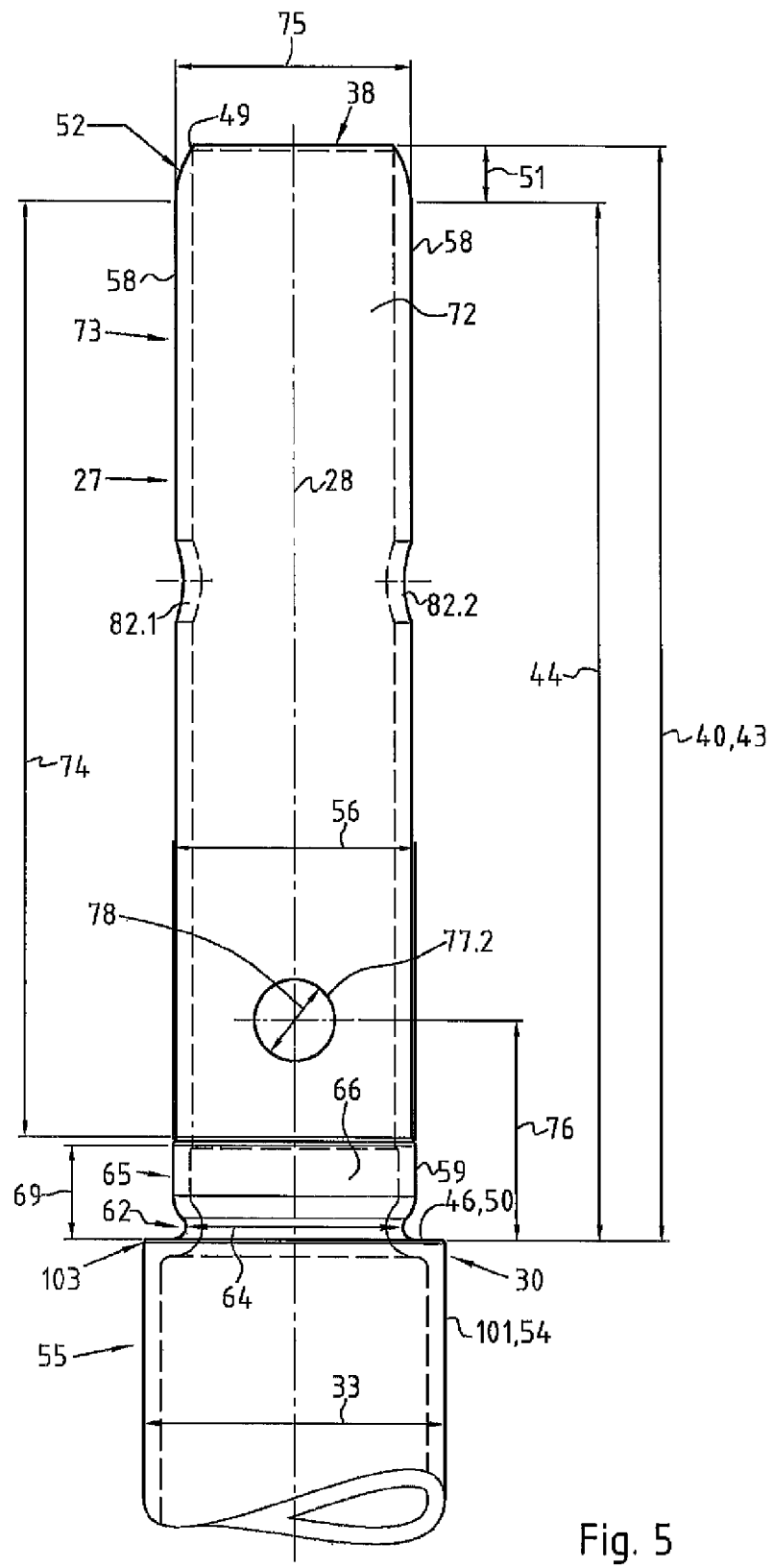
Figure 6:
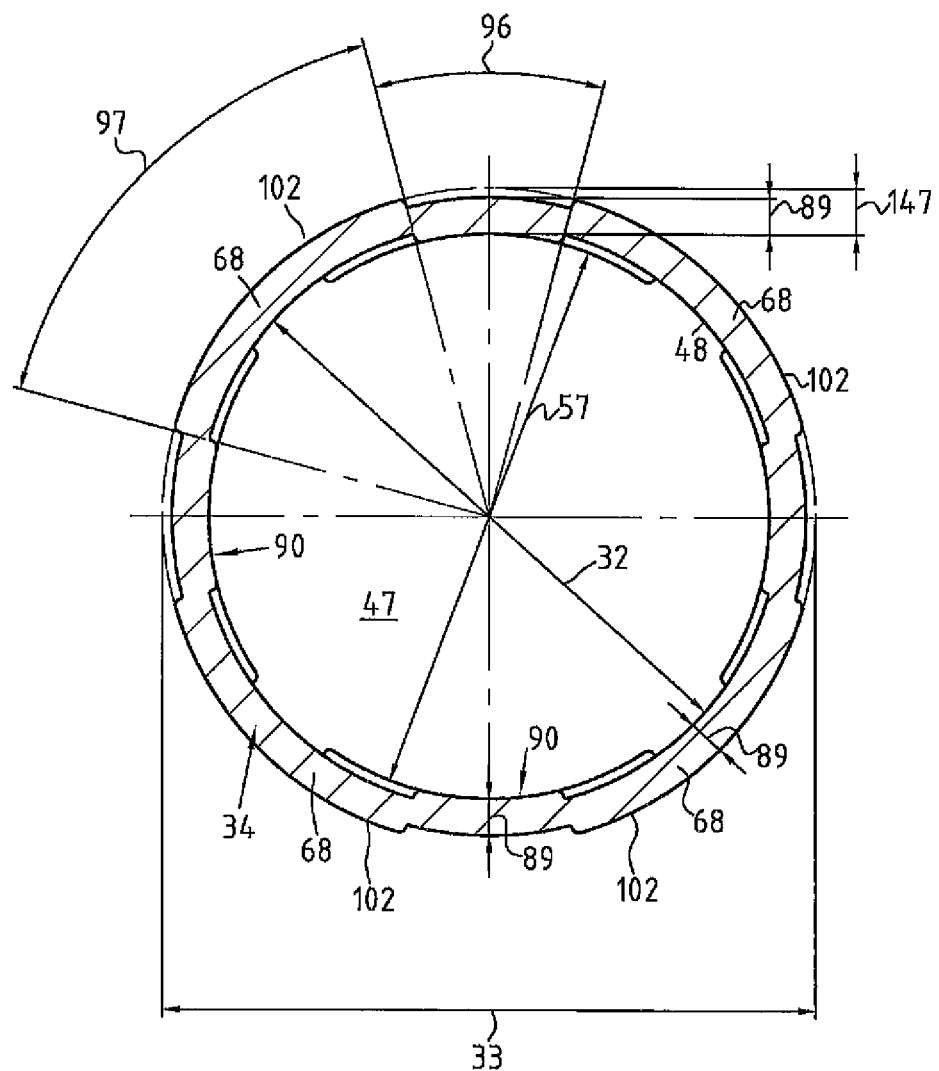
Figure 7:
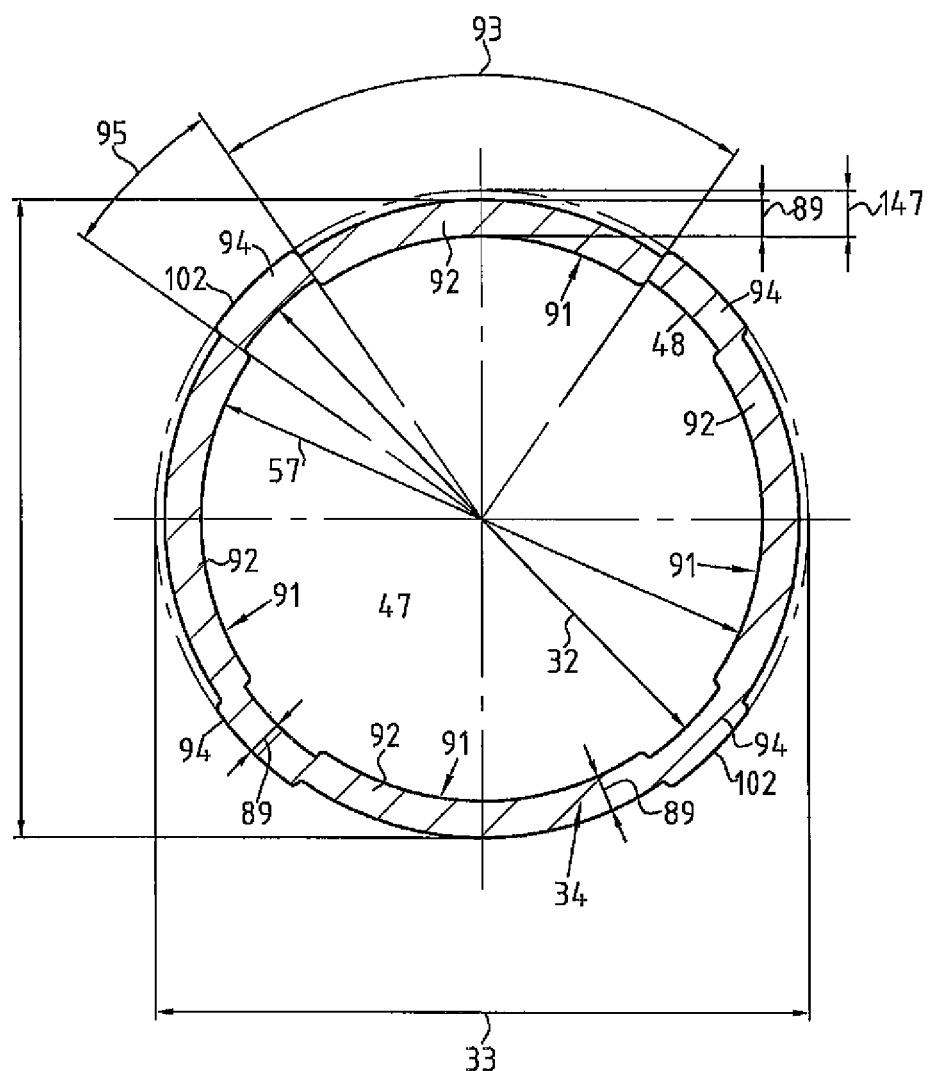
Figure 8:
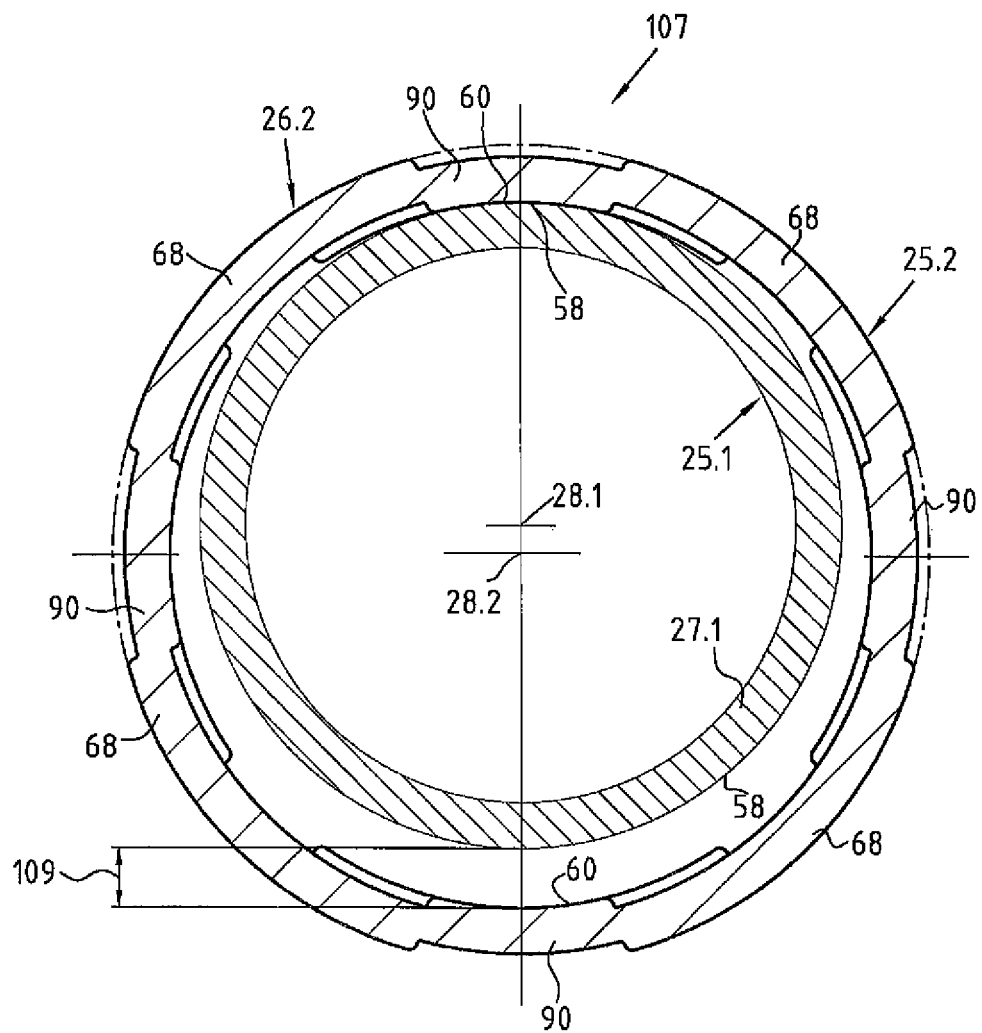
Figure 9:
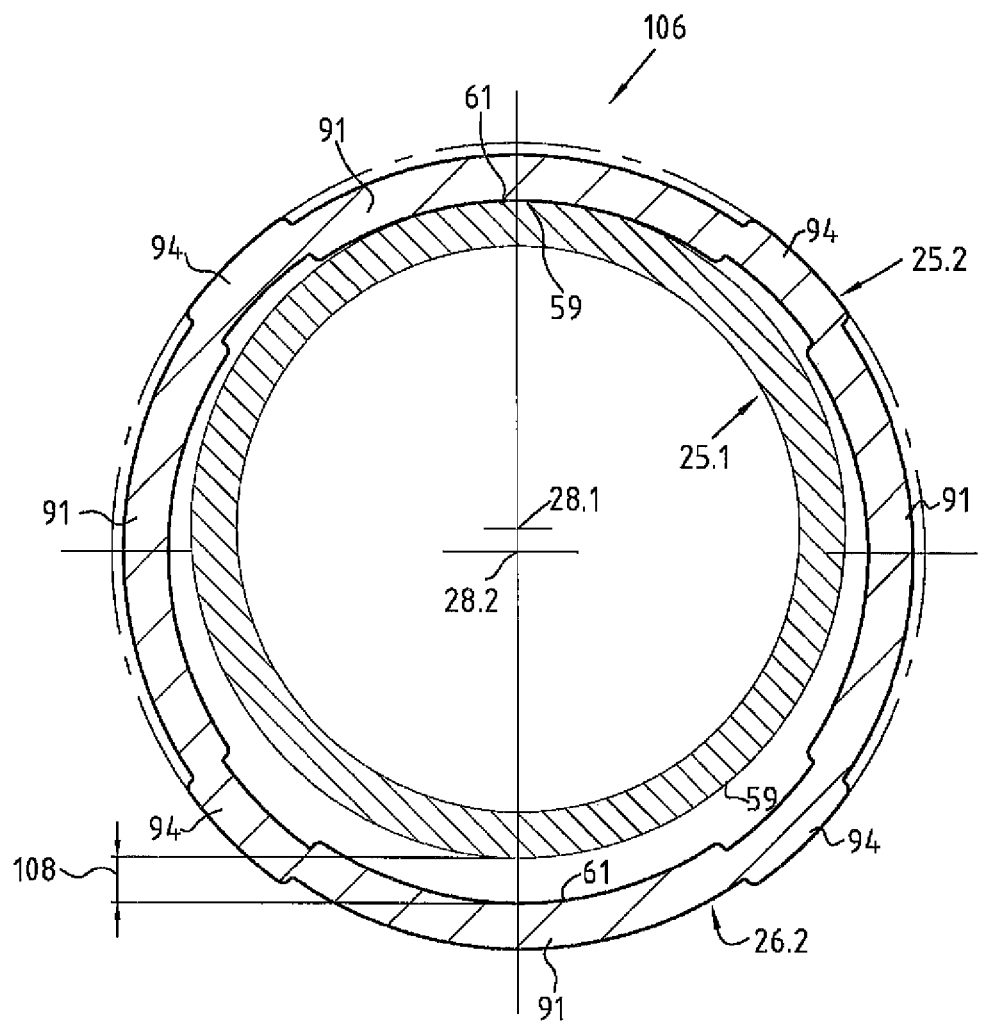
Figure 10:
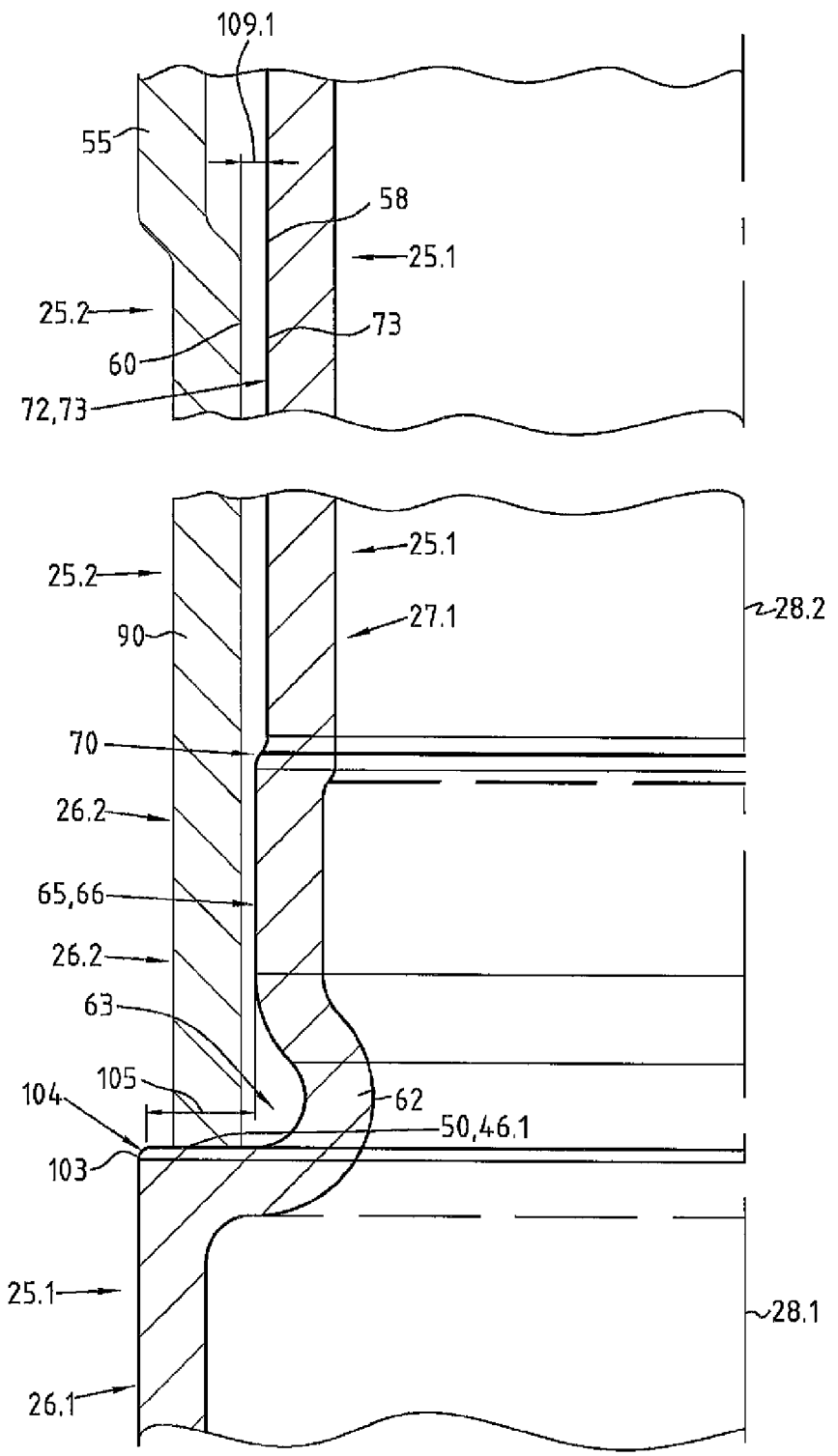
Figure 11:
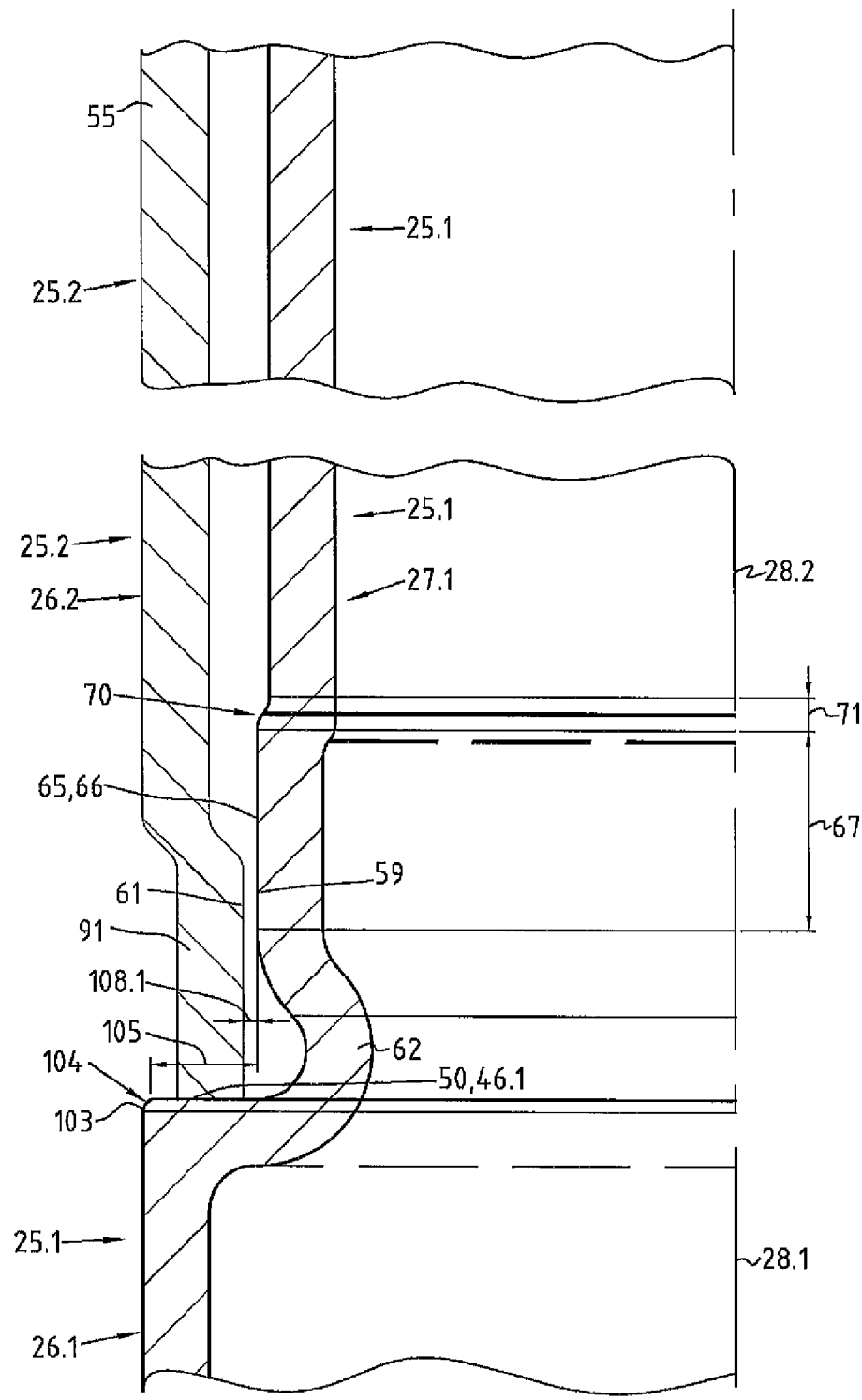
Figure 12:
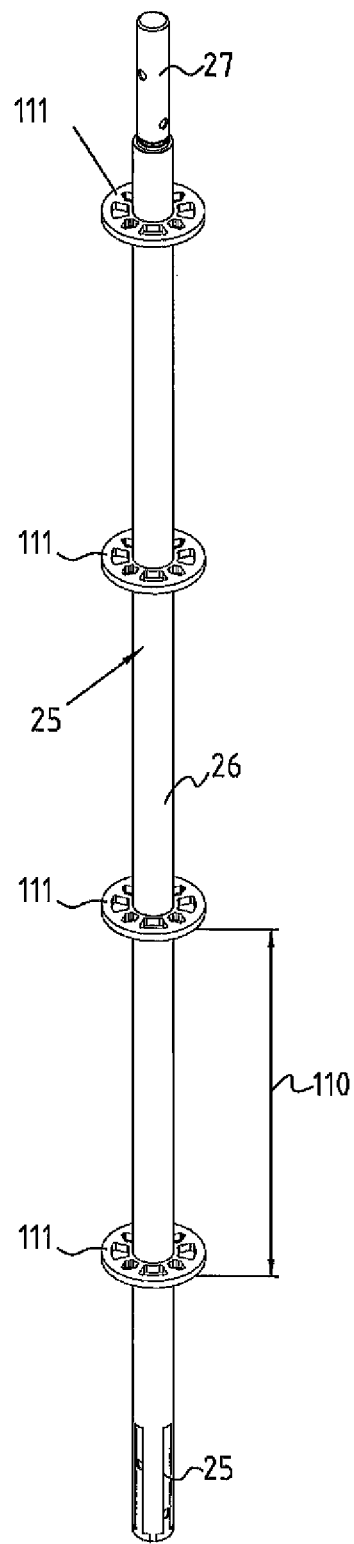
Figure 13:
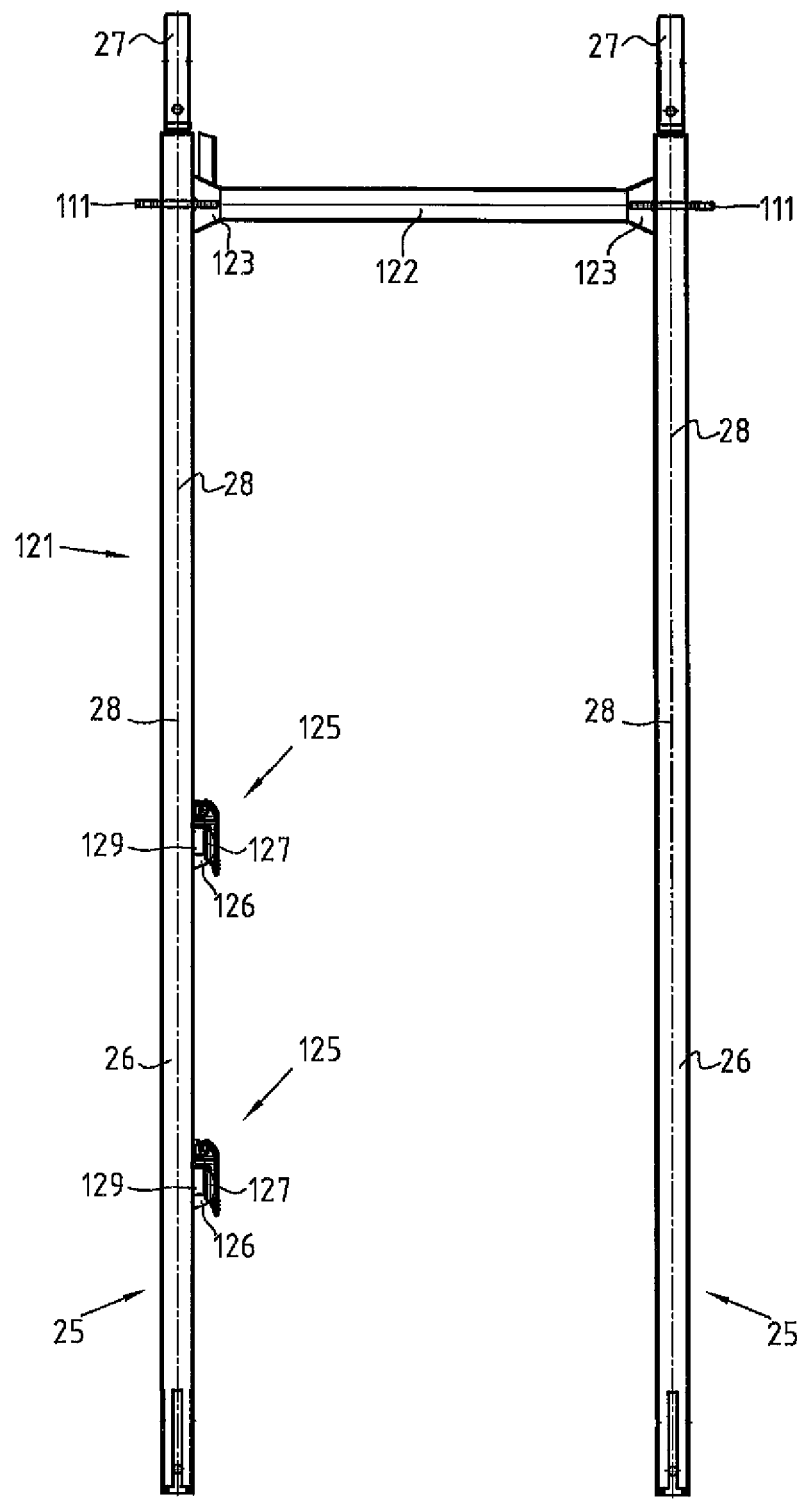
Figure 14:
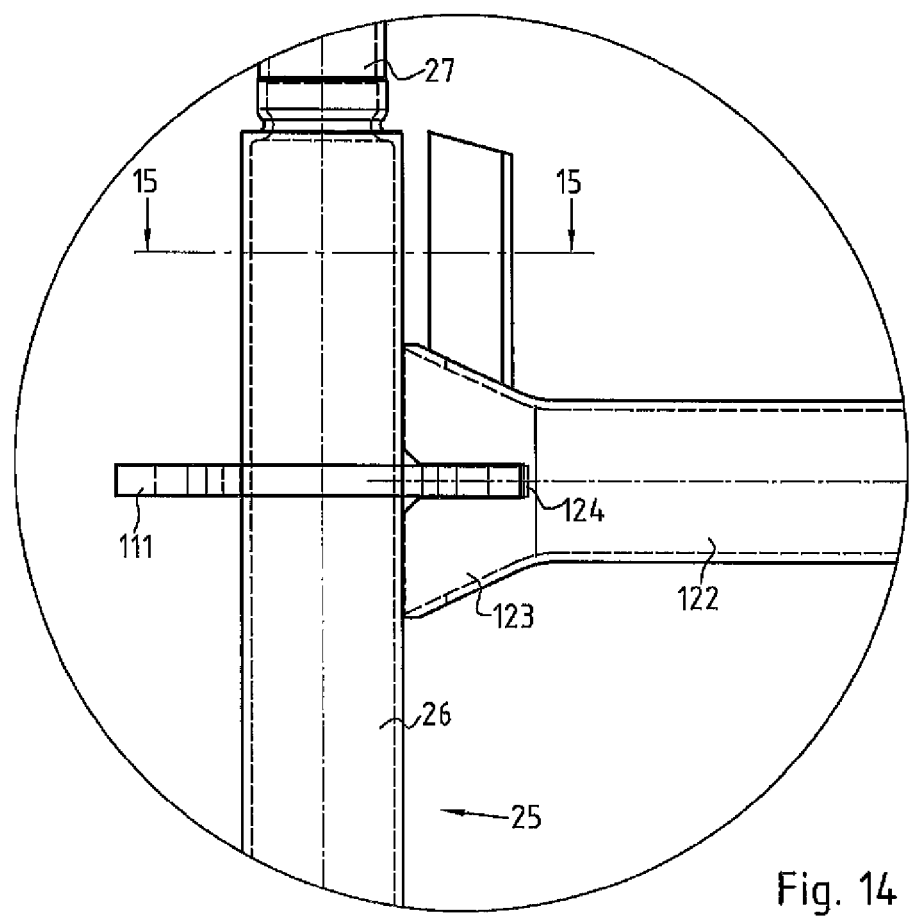
Figure 15:
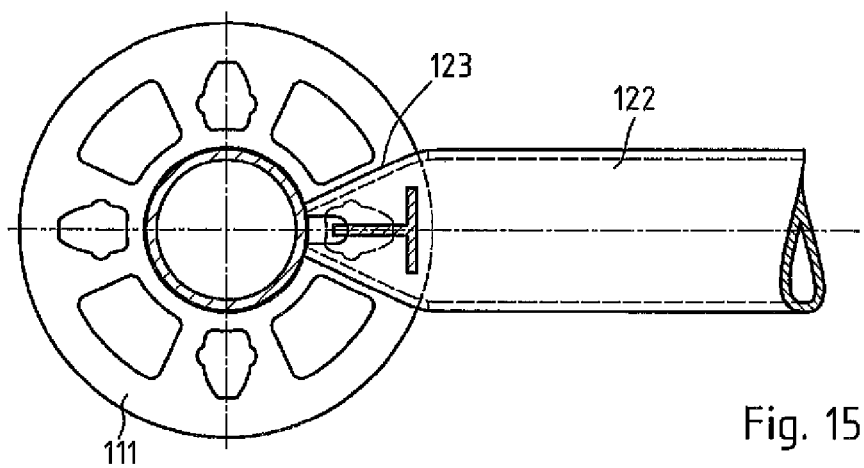
Figure 16:
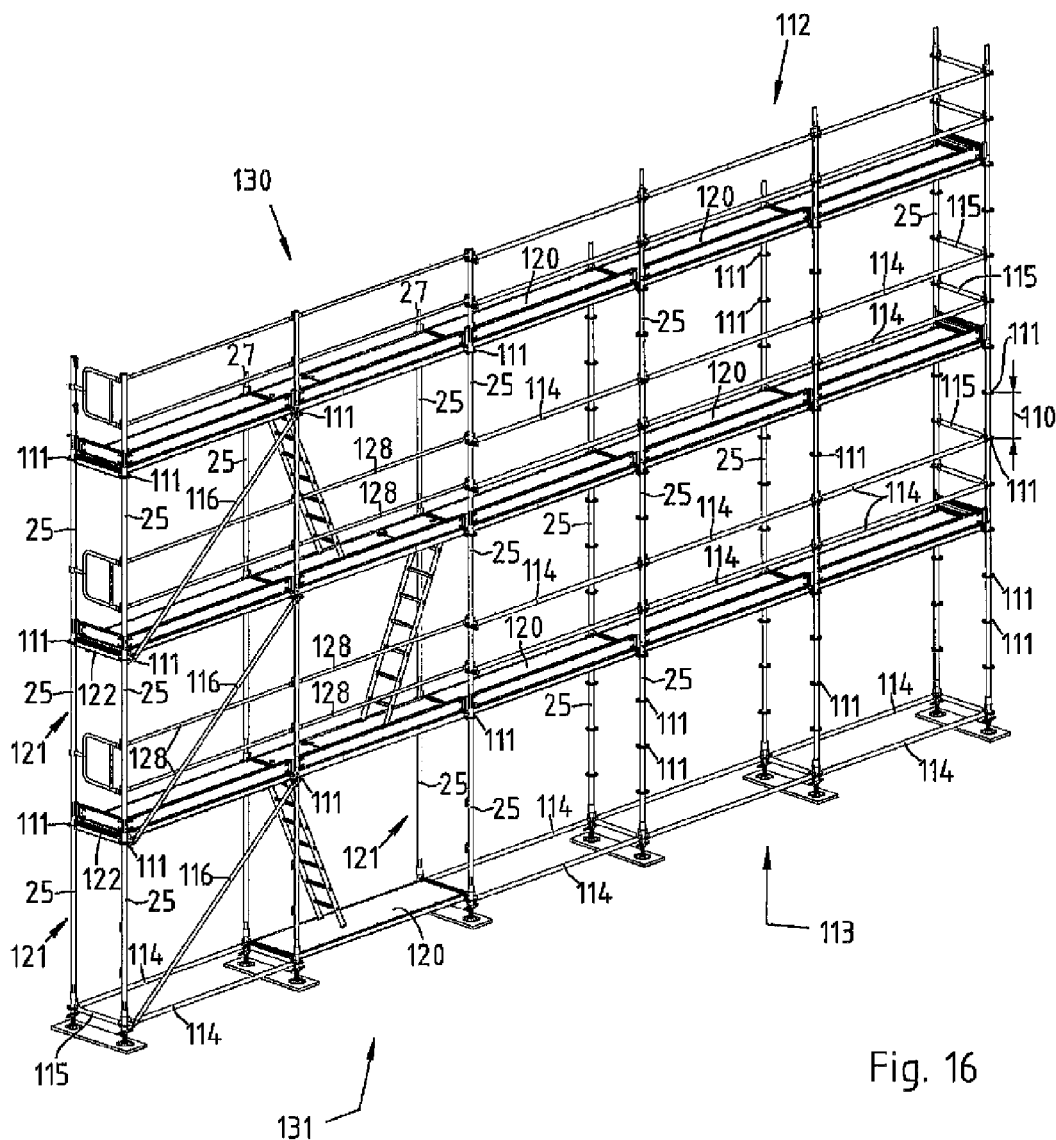
Figure 17:
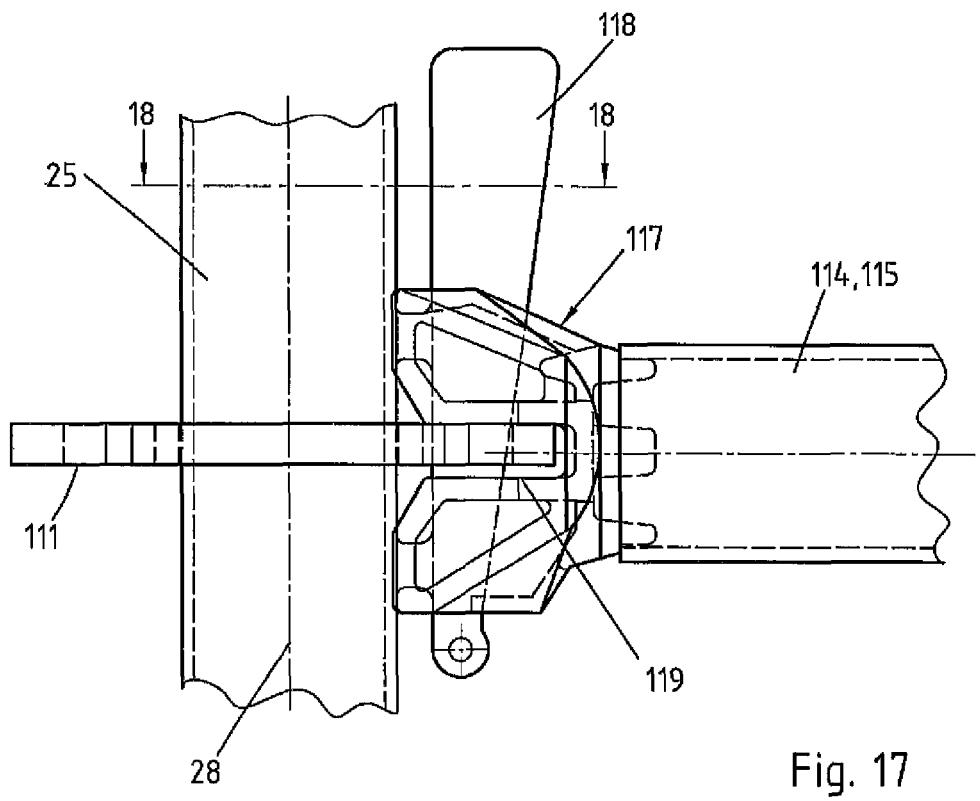
Figure 18:
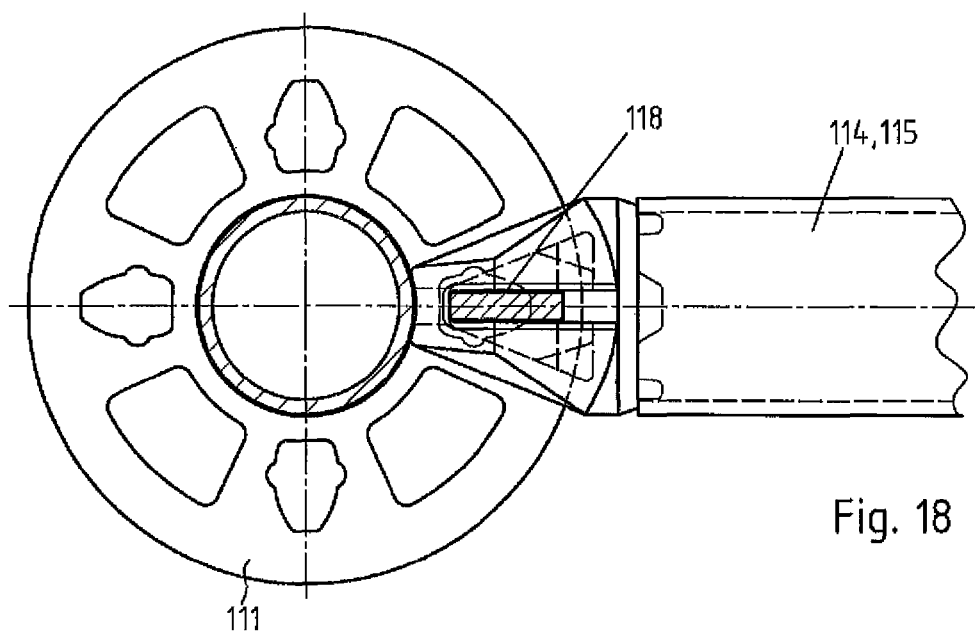
Figure 19:
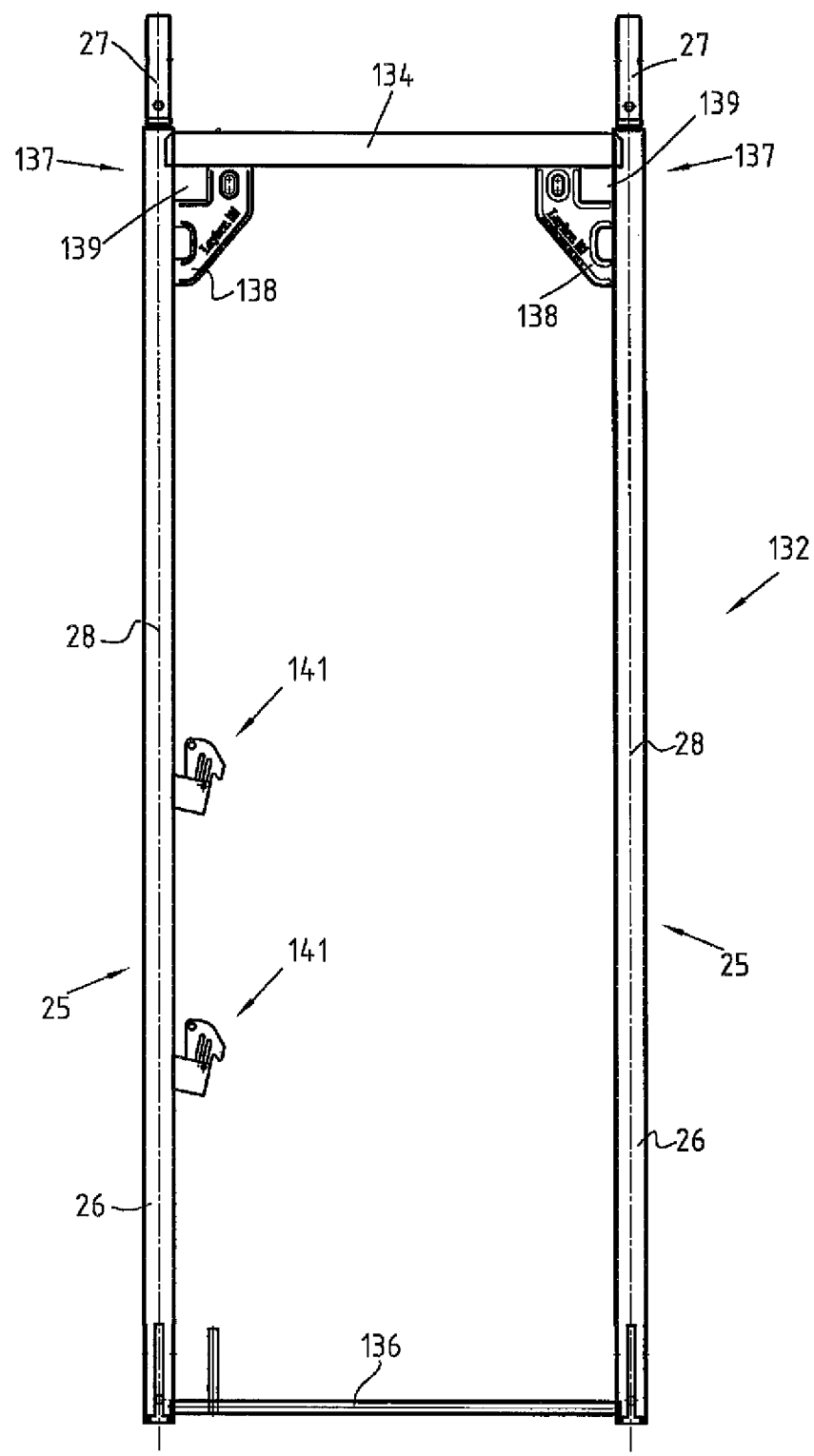
Figure 20:
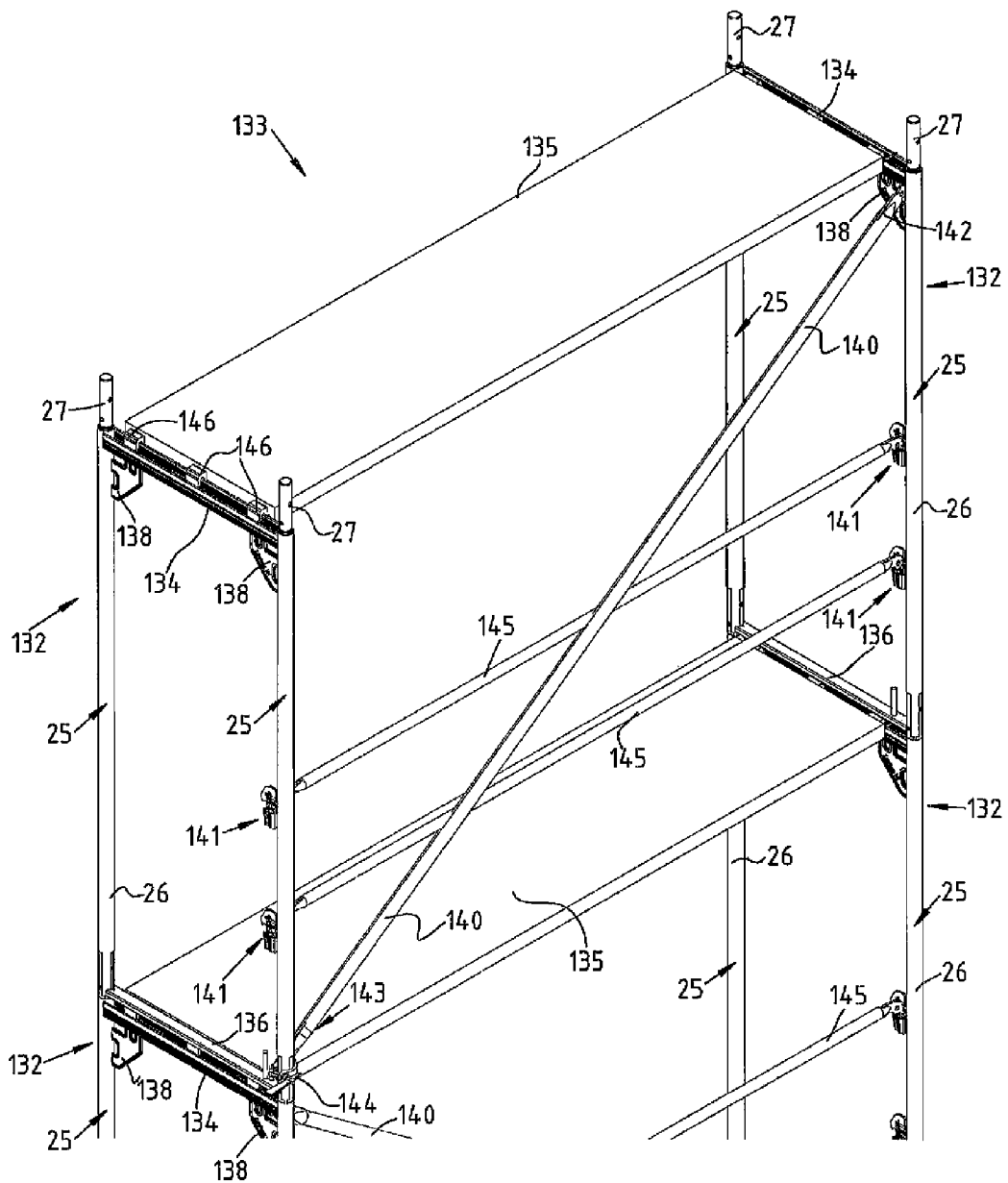

The figures show:

FIG. 1 a three-dimensional partial view of a scaffolding post according to the invention, which is illustrated with two post parts and shortened in length, for reasons of the representation, namely in the region of the tube connector, on the one hand, and in the region of the tube end section, on the other hand;

FIG. 2 a top view of the scaffolding post according to FIG. 1;

FIG. 3 a further top view of the scaffolding post, in a representation rotated by 90 degrees about the longitudinal axis, as compared with FIG. 2;

FIG. 4 an enlarged top view of the scaffolding post according to FIG. 2 in the region of the tube end section at the free tube end of the tube;

FIG. 5 an enlarged top view of the scaffolding post according to FIG. 2 in the region of the tube connector;

FIG. 6 an enlarged cross-section of the scaffolding post in the support region provided with longitudinal support indentations of T indentations, at the upper end of the tube mounting region, along the section lines 6-6 in FIGS. 2 and 4, respectively;

FIG. 7 an enlarged cross-section of the scaffolding post in the centering region provided with transverse centering indentations, at the lower end of the tube mounting region, along the section lines 7-7 in FIGS. 2 and 4, respectively;

FIG. 8 a greatly enlarged cross-section not only of the scaffolding post in a view according to FIG. 6 but also of a tube connector of the further scaffolding post inserted into the tube of this scaffolding post all the way to the stop of another scaffolding post according to the invention, lying against an inner support surface of one of the longitudinal support indentations of one of the T indentations with corresponding support surfaces of its support region;

FIG. 9 a greatly enlarged cross-section not only of the scaffolding post in a view according to FIG. 7 but also of the tube connector of the further scaffolding post inserted into the tube of this scaffolding post all the way up to the stop of the further scaffolding post, lying against an inner centering surface of one of the transverse centering indentations of the same T indentation, with corresponding centering surfaces of its centering region;

FIG. 10 a greatly enlarged longitudinal section of the scaffolding post, containing the longitudinal axis of a T indentation, along the section lines 10-10 in FIG. 4, whereby the tube connector of the further scaffolding post is inserted into the tube of this scaffolding post, all the way up to the stop of the further scaffolding post, and whereby the longitudinal center axes of the tube of the scaffolding post and of the tube connector of the further scaffolding post coincide;

FIG. 11 in a view corresponding to FIG. 10, a longitudinal section through the same T indentation, offset in the circumference direction relative to the former view, in a region of its transverse centering indentation, which projects laterally beyond the longitudinal support indentation of this T indentation, in the circumference direction, whereby once again, the tube connector of the further scaffolding post is inserted into the tube of this scaffolding post all the way to the stop of the further scaffolding post, and whereby once again, the longitudinal center axes of the tube of the scaffolding post and of the tube connector of the further scaffolding post coincide;

FIG. 12 a three-dimensional view of a scaffolding post according to the invention, which is structured as a vertical post provided with rosettes, for a modular scaffolding;

FIG. 13 a top view of a U-shaped scaffolding assembly frame for a façade scaffolding, formed by two scaffolding posts according to the invention and a cross-arm, whereby the scaffolding posts of this frame are formed by a scaffolding post according to the invention, in each instance, onto which a rosette is fastened in the region of the upper end, in each instance, whereby two railing fastening apparatuses are fastened onto the scaffolding post shown on the left, at a vertical distance from one another;

FIG. 14 an enlarged detail in the region of the upper end of the scaffolding post shown on the left in FIG. 13, with a representation of the connection node;

FIG. 15 a cross-section along the section lines 15-15 in FIG. 14;

FIG. 16 a three-dimensional view of a façade scaffolding extending over four levels or scaffolding levels, consisting of a first scaffolding field that is constructed with scaffolding assembly frames according to FIG. 13, and consisting of a second scaffolding field built onto the first, which is constructed of vertical posts according to FIG. 12 and further scaffolding components of a modular scaffolding;

FIG. 17 an enlarged side view of a connection node of the modular scaffolding;

FIG. 18 a cross-section along the section lines 18-18 in FIG. 17;

FIG. 19 a top view of a closed scaffolding assembly frame for a façade scaffolding, formed by two scaffolding posts, an upper transverse bar, and a lower transverse rod, whereby its posts are formed by scaffolding posts according to the invention, onto which the transverse bar is fastened in the region of the upper end, in each instance, and onto which the transverse rod is fastened in the region of the lower end, in each instance, and onto which a node plate is fastened, in each instance, which is also fastened onto the transverse bar, and whereby two railing fastening apparatuses are fastened onto the scaffolding post shown on the left, at a vertical distance from one another;

FIG. 20 a three-dimensional view of a façade scaffolding that extends over two levels or scaffolding levels, constructed from scaffolding assembly frames according to FIG. 19 and further scaffolding components.

The scaffolding post 25 according to the invention consists of a tube 26 and a tube connector 27 formed onto it, which are produced in one piece and from the same material, from one and the same round tube, which is not shown in the figures. The said round tube consists of steel. The original round tube has an outside circumference that is continuously delimited, in the longitudinal direction, by an essentially circular-cylindrical mantle surface. In other words the round tube is essentially configured as a circular cylinder. Accordingly, it has a cross-section essentially in the shape of a circular ring. The outside circumference of the round tube, which is essentially in the shape of a circular ring, spans an outside diameter that amounts to about 48.3 mm here. The round tube has an essentially constant wall thickness, which amounts to about 2.7 mm here. Accordingly, the round tube has an essentially circular inside circumference, which spans an inside diameter of about 42.9 mm. Furthermore, the round tube has a continuous longitudinal inner weld seam, which extends in the longitudinal direction, parallel to its longitudinal axis, and projects slightly into the interior of the round tube. Accordingly, the wall thickness of the round tube is locally slightly less than 2.7 mm in the region of the longitudinal inner weld seam.

The scaffolding post 25 produced from such a round tube therefore also consists of steel. Accordingly, it has a longitudinal inner weld seam 48. This seam is shown schematically in FIGS. 6 and 7.

To form the tube connector 27, the original round tube is reduced in diameter at one tube end, over a desired length, and subsequently swaged in a transition region between the contact or set-up surface that serves as a stop, in a transition region between the different outside diameters, in the longitudinal direction or in the axial direction of the tube. This is done in such a manner that in the end result, an essentially circular post set-up face surface 50 for setting up a further scaffolding post, which surface runs perpendicular to the longitudinal axis 28 of the scaffolding post 25 and around the longitudinal axis 28, is formed. Forming of the tube end of the original tube preferably takes place using a cold-forming method, so that the tube connector 27 is formed onto the tube, preferably by cold-forming.

The tube 26 and the tube connector 27 extend, in each instance, in the direction of the longitudinal axis 28 of the scaffolding post 25, and are configured or disposed coaxial to the longitudinal axis 28. Accordingly, the longitudinal axis of the tube connector aligns with the longitudinal axis of the tube, with formation of the longitudinal axis 28 of the scaffolding post 25.

The tube connector 27 has a free first tube connector end 38 at the end of the scaffolding post extending away from the tube 26. This end is provided with a circumferential, ring-shaped introduction cross-section narrowing 51 that is preferably formed on and narrows in the direction of the free tube connector end 38, in order to facilitate introduction and insertion of the tube connector into the tube of a further scaffolding post that can be mounted onto it. Here, the introduction cross-section narrowing 51 is structured rounded with a radius 52 that preferably amounts to about 15 mm. It is understood, however, that the introduction cross-section narrowing can also be structured with an or as an introduction cone and/or as a bevel, which cone or bevel can be configured with cone surfaces that are essentially circular-cylindrical. Preferably, the introduction cross-section narrowing 51 is or has been produced during the course of the forming process for formation of the tube connector 27, preferably at the same time, particularly also by means of cold-forming, of the original tube.

The tube connector 27 is delimited, in the direction of the tube 26, by the post set-up face surface 50, so that the tube connector 27 has a second tube connector end 39 there. The tube connector 27 has a tube connector length 40 between its free first tube connector end 38 and its second tube connector end 39. The tube connector 27 has a tube connector insertion region 41 in the region of this tube connector length 40, for insertion of the tube connector 27 into a tube of a further scaffolding post that can be mounted onto it.

The tube 26 has a first tube end 30 assigned to the tube connector 27, which end is delimited by the post set-up face surface 50. The tube 26 furthermore has a free, second tube end 31 that faces away from this tube end 30, and forms the other end of the scaffolding post 25. The tube 26, at its free tube end 31, has a circumferential, ring-shaped tube support face surface 34 that runs perpendicular to the longitudinal axis 28 of the scaffolding post 25 and around this axis, for vertical support or set-up of the scaffolding post 25, for example on or on top of a post set-up face surface of a further scaffolding post. The tube, at its free tube end 31, has a tube end section 36 that extends, proceeding from the tube support face surface 34, in the direction of the tube connector 27, and that forms a tube mounting region 37 having a length 42, for mounting of the tube 26 onto a tube connector of a further scaffolding post. The length 42 of the tube mounting region 37 essentially corresponds to the length 43 of the tube connector insertion region 41 or the tube connector length 40, or essentially to the effective tube connector length 44, but can also be smaller.

The tube connector 27, in its tube connector insertion region 41, has a maximal outside tube connector diameter 56 that is reduced as compared with a minimal inside tube diameter 57 spanned by the inside circumference of the tube end section 36 of the tube 26, in its tube mounting region 37.

The tube 26 is delimited, in its tube mounting region 37, in the longitudinal direction 29, continuously with inner tube surfaces that form inner support surfaces 60 in the form of a partial-circular-cylinder mantle, which surfaces span the minimal inside tube diameter 57.

The tube connector 27, essentially over the entire length between the introduction cross-section narrowing 51 and a transition region 62 that follows the post set-up face surface 50 directly, in the direction of the free tube connector end 38, continuously has essentially circular ring-shaped outside cross-sections, the outside diameter of which is equal to or less than the maximal outside tube connector diameter 56 in the tube connector insertion region 41. The maximal outside tube connector diameter 56 is smaller, by a specific amount, than the minimal inside tube diameter 57.

On the basis of the configuration of the tube connector 27 in its tube connector insertion region 41, on the one hand, and of the tube 26 in its tube mounting region 37, on the other hand, as described above, the scaffolding post 25 can be assembled to a further scaffolding post, for example one according to the invention or one of the same type or a conventional post, all the way to the stop 46 formed by the post set-up face surface 50, in releasable manner, with the formation of a radial gap or play (see also FIGS. 6 to 9) of, preferably at least about 2.5 to 3.5% of the maximal outside tube connector diameter 56 and/or of at least 1.0 mm or of at least about 1.3 mm, whereby the scaffolding post, during assembly to the further scaffolding post and also in the assembled state with the further scaffolding post, all the way to the stop 46, can be freely rotated relative to the further scaffolding post, about the longitudinal axis 28 of the scaffolding post 25.

The tube connector 27, in a transition region 62 that directly follows the post set-up face surface 50 in the direction of the free tube connector end 38, has a constriction 62 that runs around the longitudinal axis 28, essentially in the form of an indentation in the shape of a circular ring, particularly produced by means of cold-forming. The constriction 62 has a U-shaped or pear-shaped cross-section 63 in a longitudinal section that contains the longitudinal axis 28 of the scaffolding post 25. It spans a minimal outside diameter 64 that is slightly less than the maximal outside tube connector diameter 56 of the tube connector 27.

The said constriction 62 makes a transition, viewed in the direction of the free tube connector end 38, directly into a centering section 66 of a centering region 65 of the tube connector 27, which section spans the maximal outside tube connector diameter 56. In other words, the centering section 66 of the tube connector 27 directly follows the constriction 62 in the direction of the free tube connector end 38. The centering section 66 extends continuously, in the longitudinal direction 29 of the tube connector 27, over a centering length 67, with a first outside tube connector diameter that simultaneously forms the maximal outside tube connector diameter 56. Here, this outside diameter 56 amounts to about 38.8 mm. The centering section 66 has an essentially circular-cylindrical outside contour. Its outer surfaces form centering surfaces 59 for centering of a further scaffolding post that can be mounted or is mounted onto the tube connector 27. Here, the centering length 67 amounts to about 8 mm. In the exemplary embodiment shown, the centering section 66 ends at a distance 69, preferably of about 15 mm, from the post set-up face surface 50.

The centering section 66 of the tube connector 27 makes a transition, viewed in the direction of the free tube connector end 36, into a transition region 70 that extends over a slight transition length 71 in the longitudinal direction 28, in which region the outside diameter is reduced to a second outside tube connector diameter 75.

Directly following this transition region 70, in the direction of the free tube connector end 38, there is a support section 72 of a support region 73 of the tube connector 27. The support section 72 extends continuously, in the longitudinal direction 29 of the tube connector 27, over a support length 74 having the second outside tube connector diameter 75. This diameter amounts to about 38.0 mm here. Accordingly, it is only slightly smaller than the first and simultaneously maximal outside tube connector diameter 56 of the centering section 66. The support section 72 also has an essentially circular-cylindrical outside contour. Its outer surfaces form outer support surfaces 59 for lateral or radial support of a or of the further scaffolding post that can be mounted onto the tube connector 27. Here, the support length 74 of the support section 72 amounts to about 150 mm. The support section 72 ends, in the exemplary embodiment shown, at a distance 44 from the post set-up face surface 50. This distance 44 corresponds to the effective tube connector length 44 of the tube connector 27. The effective tube connector length 44 is understood to be the specific length of the tube connector 27 over which the connector can transfer forces laterally or radially, by way of its outer support surfaces 58 of its support region 73, particularly if the tube of a scaffolding post, for example one according to the invention or of a similar type, or of a conventional post, is mounted onto the tube connector 27 all the way up to the stop 46.

The said support section 72 is followed, in the direction of the free tube connector end 38, by the introduction cross-section narrowing 51 that was already mentioned above. Here, its length 51 amounts to about 10 mm. The introduction cross-section narrowing 51 is rounded with a radius 52 that amounts to 15 mm here. The entire tube connector length 43 amounts to about 175 mm in the exemplary embodiment shown.

The tube connector 27 has two passage bores 77.1, 77.2 having an inside diameter 78 that preferably amounts to about 13.0 mm, at a distance 76, preferably of about 35 mm, from the post set-up face surface 50. The center-point axes of these passage bores 77.1, 77.2 align with one another, so that a cylinder bolt, not shown, can be inserted through these passage bores 77.1, 77.2. Such passage bores are also known, such as two passage bores 80.1, 80.2 in the lower tube end section 36 of the tube 26 that correspond to them. These are provided at an equally great distance 81, preferably of about 35 mm, now from the tube support face surface 34, and also have the same inside diameter 78, preferably of about 13 mm.

In addition, not only the tube connector 27 but also the tube 26 have a pair of further passage bores 82.1, 82.2; 83.1, 83.2, in each instance, which are disposed offset by an angle of 90 degrees around the longitudinal axis 28, in the circumference direction, relative to the passage bores 77.1, 77.2; 80.1, 80.2 mentioned above. Furthermore, these further passage bores 82.1, 82.2; 83.1, 83.2 are disposed, in each instance, viewed in the direction of the free tube connector end 38, offset by an equal distance 84 or 85, preferably of about 70 mm, relative to the aforementioned passage bores 77.1, 77.2; 80.1, 80.2. Use of the scaffolding posts 25 according to the invention not only as standing scaffolding tubes but also as suspended posts is made possible by means of these "cross-bores," in particularly economical manner. Because the effort previously required for this, using two different posts or tube connectors, namely a first scaffolding post having a screwed-on, separate tube connector and a second scaffolding post suspended on it, having a pressed-in tube connector, or having a tube connector formed on by means of a bead, can therefore be eliminated.

When two scaffolding posts according to the invention are assembled by way of their tube connectors, these scaffolding posts can be rotated about their longitudinal axes 28, relative to one another, to such an extent that the aforementioned passage bores 77.1, 77.2 and 82.1, 82.1 of the first tube connector 27.1 align with the passage bores 80.1, 80.2 and 83.1, 83.2 of the second scaffolding post 25.2. Then, a cylindrical fastening bolt (not shown) can be inserted, in each instance, not only through the passage bores 80.1, 80.2 disposed adjacent to the free tube end of the mounted scaffolding post 25.2, along with the passage bores 77.1, 77.2 of the inserted tube connector that align with them, but also through the passage bores 80.1, 80.2 disposed at a distance from them in the direction of the free tube connector end 38 and offset by 90 degrees, along with the passage bores of the tube connector 81.2, 82.2 that align with them and fixed in place in known manner.

The tube mounting region 37 of the tube 26 is provided with four T-shaped indentations 86, the longitudinal axes 87 of which extend parallel to the longitudinal axis 28 of the scaffolding post 25. Each T-shaped indentation 86, which is also referred to as a T indentation 86, is configured with an inside tube cross-section narrowing, in each instance, in other words projects into the interior 47 of the tube 26. The T indentations 86 are disposed offset from one another at equal circumference angles of 90 degrees, in the circumference direction, around the longitudinal axis 28 of the scaffolding post 25. They are therefore disposed at equal distances from one another in the circumference direction 88. Each of these T indentations 86 consists of a support indentation 90 that extends in the direction of the longitudinal axis 28 of the scaffolding post 25, parallel to this axis, for lateral support of a tube connector of a further scaffolding post that can be inserted or is inserted into the tube 26, and furthermore consist of a centering indentation 91 disposed at the free tube end 31 and extending essentially perpendicular to the former, for centering of the tube connector of the further scaffolding post that can be inserted or is inserted into the tube 26. The transverse centering indentation 91 is delimited by a ring section surface 92 of the tube support face surface 34 that runs perpendicular to the longitudinal axis 28 of the scaffolding post 25.

The transverse centering indentation 91 is disposed symmetrical to the longitudinal axis 87 of the longitudinal support indentation 90 of the T indentation 86, in other words projects beyond the related longitudinal support indentation 90, in the circumference direction 88, by an essentially equally great width or by an essentially equally great circumference angle. Each T indentation 86 is therefore disposed symmetrical to the longitudinal axis 87 of its support indentation 90 or symmetrical to the longitudinal axis 28 of the scaffolding post 25. The transverse centering indentation 91 or the related inside tube cross-section narrowing extends continuously in the circumference direction 88, and the longitudinal support indentation 90 or the related inside tube cross-section narrowing extends continuously in the longitudinal direction 29.

The transverse centering indentation 91 or the related inside tube cross-section narrowing extends, in the circumference direction, around the longitudinal axis 28 of the scaffolding post 25, over a circumference angle 93 that amounts to about 70 degrees here. Accordingly, the non-indented tube section 94, which is configured, in the circumference direction 88, between two adjacent transverse centering indentations 91, extends, in the circumference direction, around the longitudinal axis 28, over a circumference angle 93 that amounts to about 20 degrees here. In contrast to this, the longitudinal support indentation 90 or the related inside tube cross-section narrowing extends, in the circumference direction 88, around the longitudinal axis 28, over a clearly smaller circumference angle 96 that amounts to about 30 degrees here. Accordingly, the non-indented tube section 68, which is configured, in the circumference direction 88, between two adjacent longitudinal support indentations 90, extends, in the circumference direction 88, around the longitudinal axis 28, over a circumference angle 97 that amounts to about 60 degrees here.

Not only the transverse centering indentations 91 but also the longitudinal support indentations 90 of the T indentations 86 are delimited, viewed in the circumference direction 88, by cylindrical outer surfaces and by cylindrical inner surfaces that run approximately parallel to them. The said outer surfaces of the transverse centering indentation 91 make a transition, with alignment, into the said outer surfaces of the longitudinal support indentation 90 of the T indentation 86, in each instance. The said inner surfaces of the transverse centering indentation 91 make a transition, with alignment, into the said inner surfaces of the longitudinal support indentation 90 of the T indentation 86, in each instance. In a longitudinal section that contains the longitudinal axis 28, the said inner surfaces of the transverse centering indentation 91 and also the said inner surfaces of the longitudinal support indentation 90 are delimited by a straight line. The same holds true for the said outer surfaces of the transverse centering indentation 91 and the said outer surfaces of the longitudinal support indentation 90 of the T indentation 86, in each instance (see also FIGS. 10 and 11).

The said inner surfaces of the transverse centering indentation 91 form inner centering surfaces 61 for a further scaffolding post that can be inserted or is inserted into the tube 26, and the said inner surfaces of the longitudinal support indentation 90 form inner support surfaces 60 for the further scaffolding post that can be inserted or is inserted into the tube 26. The transverse centering indentation or the related inside tube cross-section narrowing has an essentially constant length 98 essentially over the entire circumference region in which it projects laterally beyond the related longitudinal support indentation 90, viewed in the longitudinal direction 29. The longitudinal support indentation 90 or the related inside tube cross-section narrowing has an essentially constant width 100 essentially over its entire length 99, viewed in the circumference direction. The said length 98 of the transverse centering indentation 91 amounts to about 10 mm in the exemplary embodiment. The said length 99 of the longitudinal support indentation 90 preferably amounts to about 140 or about 150 mm. Accordingly, the T indentation 86, in each instance, has a length 42 that preferably amounts to about 150 mm or about 165 mm.

The T indentations 86 are preferably disposed in such a manner that they do not contain the longitudinal inner weld seam 48. In other words, the longitudinal inner weld seam 48 is preferably disposed in a non-indented tube section that extends, preferably continuously, in the longitudinal direction 29, and is disposed, viewed in the circumference direction 88, running between two adjacent transverse centering indentations 91 of the adjacent T indentations 86. In other words, the T indentations 86 are therefore preferably disposed in such a manner that the longitudinal inner weld seam 48 is disposed or runs in a non-indented tube section 94 present between two adjacent transverse centering indentations 91 of two adjacent T indentations 86.

The tube 26 is delimited, in its tube mounting region 37 in the non-indented tube sections 94, 96 that extend in the longitudinal direction 29, viewed in the circumference direction, between the T indentations 86, on the outside of the tube or toward the outside, by means of outer surfaces 101 essentially in the form of a circular-cylindrical mantle. These outer surfaces 101 of the tube 26 span an outside tube diameter that corresponds to the maximal outside tube diameter 33 of the tube 26, which amounts to about 48.3 mm here. These outer surfaces 101 are the outer surfaces of the original round tube, not yet provided with the T indentations 86.

The said outer tube surfaces 101 of the non-indented tube sections 94, 96 that run or are configured between the T indentations 86 in the circumference direction 88 make a transition, in the region of the ends of the T indentations 86 or ends of their longitudinal support indentations 90, which ends face away from the free tube end 31, viewed in the direction of the free tube end 38, into essentially circular-cylindrical outer tube surfaces 54, 101 of a tube section 55 of the tube 26. There, the tube 26 therefore has an outside tube diameter 33 that also corresponds to the maximal outside tube diameter 33. In the said tube section 55, the outside tube diameter 33 therefore also amounts to about 48.3 mm. The said essentially circular-cylindrical tube section 55 of the tube 26 extends, viewed in the longitudinal direction 29, between the tube mounting region 37 or between the T indentations 86 or between the said ends of their longitudinal support indentations 90, and a transition region 103 between the tube 26 and the tube connector 27, here in the region of the first tube end 30 assigned to the tube connector 27 configured between the tube 26 and the post set-up face surface 50. The said tube end section 55 makes a transition, in the exemplary embodiment, viewed in the direction of the free tube connector end 38, without a bead, in other words without a bead that projects radially beyond the maximal outside tube diameter 33, into the post set-up face surface 50, which follows viewed in the direction of the free tube connector end 38. According to the invention, the transition region 103 is structured with the smallest possible transition radius 104, which amounts to about 1.0 mm here or is smaller. Preferably, the transition radius 103 is structured with as sharp an edge as possible, in other words with an essentially circular ring edge. Accordingly, the transition region 103 is preferably structured in such a manner that the greatest possible post set-up face surface 50 is maintained. Taking into consideration the diameter relationships that are present in the exemplary embodiment, i.e. at a maximal outside tube diameter 33 of the tube 26 of about 48.3 mm and at a maximal outside tube connector diameter 56 of the tube connector 27 of about 38.8 mm, the maximal set-up width 104 of the post set-up face surface that can be used for setting up a further scaffolding post amounts circumferentially to about 3.75 mm at a transition radius 104 that amounts to about 1.0 mm (see FIGS. 9 and 11). In comparison with this, the maximal support width 147 of the ring-shaped tube support face surface 34 configured at the free tube end 31 amounts to about 3.7 mm (see also FIGS. 6 and 7). This support width 147 is obtained from calculations, taking into consideration the non-indented tube wall parts 68, 94, which have a wall thickness of about 2.7 mm, and taking into consideration the indentations indented radially inward or into the interior 47 of the tube 26, by about 1.0 mm, which also have a wall thickness of about 2.7 mm. This maximal usable support width 147 of the ring-shaped tube support face surface 34 is therefore smaller here than the corresponding maximally usable set-up width 105 of the ring-shaped post set-up face surface 50, so that even in the case of slight lateral or radial offset, within the scope of possible play, of two scaffolding posts mounted onto one another, essentially full-area contact of a second scaffolding post mounted onto the tube connector of a scaffolding post, with its tube support face surface on the corresponding tube set-up face surface of the first scaffolding post is obtained.

Supplementally, it can be pointed out that the tube 26 is structured, over its entire tube length between the transition region 103 and its free tube end 31, with an essentially constant outside tube cross-section that spans an outside tube diameter 33, which cross-section corresponds to an outside cross-section of the original round tube that spans a corresponding outside diameter. Furthermore, it is advantageous if the tube connector 27 and the tube 26, with the exception of transition and end regions, are delimited toward the outside with outer surfaces essentially in the form of circular-cylindrical mantles over the entire length of the scaffolding post 25.

When two scaffolding posts 25; 25.1, 25.2 according to the invention are assembled, by way of their tube connectors 27.1, all the way to the related stop, a certain play or a certain gap occurs between the outer surfaces or outside surfaces of the tube connector 27.1 of a first scaffolding post 25.1 and the corresponding inner surfaces or inside surfaces of the tube 26.2 of a second scaffolding post 25.2, in the connection regions 106, 107. Viewed in the longitudinal direction 29, this play or this gap is differently great in a connection region in which the tube connector insertion region 41 of the tube connector 27.1 of the first scaffolding post 25.1 overlaps the tube mounting region 37 of the tube 26.2 of the second scaffolding post 25.2 that has been mounted onto it (see also FIGS. 8 to 11).

When the tube connector 27.1 of the first scaffolding post 25.1 lies against the corresponding inner support surfaces 60 of the tube 26.2 of the second scaffolding post 25.2 with the outer support surfaces 58 of its support region 73, in a connection region 107, and furthermore against the corresponding inner centering surfaces 61 of the tube 26.2 of the second scaffolding post 25.2 with the outer centering surfaces 59 of its centering region 65, in a connection region 106, in other words against the inside of the tube 26.2, a connection situation such as that shown in FIGS. 8 and 9, as an example, occurs. Then, for one thing, there is a maximal radial centering gap 108 (see FIG. 9). This maximal centering gap 108 or this maximal centering play 108 amounts to about 2.1 mm in the exemplary embodiment.

For another thing, there is then a maximal radial support gap 109 or a corresponding maximal radial support play 109 (see also FIG. 8). This maximal support gap 109 or this maximal support play 109 amounts to about 2.9 mm in the exemplary embodiment.

When the first scaffolding post 25.1 and the second scaffolding post 25.2 are mounted onto one another in such a manner that their longitudinal axes 28.1, 28.2 align, an arrangement occurs in the said connection regions 106 and 107 as illustrated in FIGS. 10 and 11, once again in the support region (FIG. 10) and in the centering region (FIG. 11). The gap configured there, in each instance, or the play 109.1 configured there, in each instance, is then half as great as the said maximal support gap or the said maximal support play 109. Accordingly, the gap configured there, in each instance, or the play 108.1 configured there, in each instance, is then half as great, in each instance, as the said maximal centering gap or the said maximal centering play 109.

Some typical application or use examples for the scaffolding posts 25 according to the invention, in which these can also be combined or mixed with scaffolding posts of the same type or with conventional scaffolding posts, are illustrated in FIGS. 12 to 20.

FIG. 12 shows a scaffolding post 25 according to the invention, onto which rosettes in the form of preferably perforated disks 111 have been pushed and welded in place, at longitudinal distances 110, preferably of about 50 cm, that correspond to a specific grid dimension. This is therefore the post of a modular scaffolding, such as the one that can be constructed in the scaffolding field 113 shown on the right in FIG. 16, based on the scaffolding posts 25 according to the invention. For this purpose, longitudinal bars 114, transverse bars 115, and diagonals 116, in particular, can be wedged in place, in usual manner, using connection heads 117 or wedge heads 117 attached at both ends, onto the perforated disks 111, using their connection wedges 118 (FIGS. 17 and 18). In usual manner, deckings 120 can be fastened onto the transverse bars 115, for example using usual suspension hooks or claws. For protection to prevent people falling down from the deckings 120, the longitudinal bars 114 and the transverse bars 115 can also function as railing rods or bars. The modular scaffolding 112 constructed on the basis of the scaffolding posts 25 according to the invention corresponds, in terms of its structure, to the known LAYHER Allround modular scaffolding, and is fully compatible with it.

FIG. 13 shows a U-shaped scaffolding assembly frame 121 which is open toward the bottom. It consists of two scaffolding posts 25 according to the invention, disposed parallel to one another, and of a single transverse bar 122. The transverse bar 122 is mounted onto a single perforated disk 111, in each instance, of the scaffolding post 25, in each instance, by way of the horizontal slots 124 of its two connection heads 123 (see also FIGS. 14 and 15). The perforated disk 111 is welded on in the upper end region of the tube 26 of the scaffolding post 25, in each instance, assigned to the tube connector, in each instance. The connection head 123, in each instance, of the transverse bar 122 is firmly welded onto not only the related perforated disk 111 but also to the related post 25. This scaffolding assembly frame 121 corresponds, in terms of its structure, to the "LAYHER Star frame" that has been known for several years. The scaffolding post 25 shown on the left in FIG. 13 has two railing fastening apparatuses 125 that are fastened onto this scaffolding post 25 at a longitudinal distance from one another. The railing fastening apparatuses 125 are structured, in each instance, with a bracket-shaped holder 126 that has a vertical slot, and a pivot lever 127, by means of which railing rods 128 inserted through the slots 129 of the holders 126 can be releasably fixed in place (FIG. 16).

Connection, holding and/or support elements, such as longitudinal bars 114, transverse bars 115 and/or diagonals 116, for example, of a or of the modular scaffolding 112 can be releasably fastened onto the perforated disks 111 of these scaffolding assembly frames 121, by way of their connection heads 117. This and the construction of an assembly frame scaffolding 130 as a façade scaffolding, which is constructed on the basis of these assembly frames 121, is also illustrated in FIG. 16, specifically in the scaffolding field 131 shown there on the left. To construct this assembly frame scaffolding 130 as a façade scaffolding, longitudinal bars 114, transverse bars 115 and/or diagonals 116 can advantageously be used, as they are used or can be used for construction of the modular scaffolding 112 shown in the right scaffolding field 113 in FIG. 16.

Reinforcement of the assembly frame scaffolding 130 therefore takes place by means of the said scaffolding components 115, 116, 117 of the modular scaffolding 112, in that these are fixed in place on the perforated disks 111 of the scaffolding posts 25, using their connection heads 117. Here, too, deckings 120 can be fastened onto the transverse bars 122 of the assembly frames 121, specifically, in particularly advantageous manner, at the same height as in the case of the modular scaffolding 112.

The façade scaffoldings 130 constructed with scaffolding assembly frames 121 provided with scaffolding posts 25 according to the invention, which are composed of the previously known "LAYHER Star frames," are also fully compatible, as with the previous "LAYHER Allround scaffolding system."

FIG. 19 shows a different scaffolding assembly frame 132 for construction of a different façade scaffolding 133. This scaffolding assembly frame 132, in contrast to the scaffolding assembly frame 121 shown in FIG. 13, is structured as a closed vertical frame. This scaffolding assembly frame 132 consists, once again, of two parallel scaffolding posts 25 according to the invention. The scaffolding posts 25 are connected with one another, in the upper end region of their tubes 26, below the tube connector 27, in each instance, by way of a transverse bar 134 and, in the lower region, by way of a transverse rod 136, which is disposed parallel to the transverse bar 134. Not only the transverse bar 134 but also the transverse rod 136 is welded in place, at both ends, on the scaffolding post 25, in each instance. Deckings 135 can be suspended on the transverse bar 134, in known manner (FIG. 20).

In the corner region 37 of the connection of the transverse bar 134 to the scaffolding post 25, in each instance, a so-called node sheet 138 is welded in, below the transverse bar 134, in each instance. This sheet possesses, among other things, a corner recess 139 for shape-fit anchoring of a diagonal 140 (FIG. 20). Two railing fastening apparatuses 141 are fastened onto the scaffolding post 25 shown on the left in FIG. 19, at a distance from one another vertically or in the longitudinal direction. These are also known by the name "LAYHER wedge boxes." This scaffolding assembly frame 132 corresponds, in terms of its structure, to the scaffolding assembly frames of the known "LAYHER SpeedyScaf scaffolding system" and is fully compatible with it.

A façade scaffolding 133 that can be constructed with such scaffolding frames 132 is illustrated in FIG. 20. This façade scaffolding 133 corresponds, in terms of its structure, to the known "LAYHER SpeedyScaf façade scaffolding" and is fully compatible with it. To construct the scaffolding 133, two adjacent scaffolding assembly frames 132 are reinforced by way of a diagonal 140, in such a manner that the diagonal 140 is inserted, with its insertion end 142, into the corner recess 139 of the node sheet 138 of a first scaffolding assembly frame 132, shown on the right here, and, after being pivoted downward, is anchored with shape fit on the node sheet 138. The diagonal 140 is fastened, by way of a coupling 144 provided at its other end 143, particularly by way of a wedge tube coupling, onto a scaffolding post 25 of the second scaffolding assembly frame 132, shown on the left here, disposed on the same side of the scaffolding 133 as the aforementioned node sheet 138.

Railing rods 145 can be inserted onto the or into the railing fastening apparatuses 141 with their corner tabs, which are angled away perpendicularly, onto the railing fastening apparatuses 141 of the posts 25 of the adjacent scaffolding assembly frames 132, disposed on the same side of the scaffolding 133, and can be wedged in place there, in releasable manner. Deckings 135 can be fastened, preferably using suspension hooks or claws, onto the transverse bars 134 of the scaffolding assembly frames 132, which bars are preferably configured with U profiles that are open toward the top.

The scaffolding assembly frames that can be constructed or provided with scaffolding posts 25 according to the invention, for example the scaffolding assembly frames 121 and 132, as well as the scaffoldings constructed with scaffolding assembly frames according to the invention, in other words, for example, the assembly frame scaffolding or façade scaffolding 131 shown on the left in FIG. 16 and the modular or façade scaffolding 112 shown on the right in FIG. 16, and also the façade scaffolding 133 shown in FIG. 20, are fully compatible with conventional scaffolding assembly frames or scaffoldings that are the same or similar in terms of the construction, particularly with those of the LAYHER company. Combining or mixing the scaffolding posts 25 according to the invention and the scaffolding frames that can be constructed or are constructed from them, for example the scaffolding assembly frames 121 and 132, as well as the scaffoldings that can be constructed or are constructed from the scaffolding frames according to the invention, in other words, for example, the scaffoldings 112, 130, and 133 shown in FIGS. 16 and 20, with conventional scaffolding posts, conventional scaffolding frames, conventional other scaffolding components of conventional scaffolding systems, and these conventional scaffolding systems, particularly those of the LAYHER company, is possible without problems, so that old and new scaffolding posts and scaffolding components that are constructed or formed from them, as well as scaffoldings can be mixed or combined, without any system change or also going beyond systems, in particularly economical manner.

It is understood that the invention is not restricted to the exemplary embodiments shown in the figures and described above, but rather, a scaffolding post according to the invention or multiple scaffolding posts according to the invention, and scaffolding frames and scaffoldings that can be constructed from them or formed with them can also be configured, dimensioned and/or structured differently, within the scope of the object of the invention established in the claims.

REFERENCE SYMBOL LIST 25 scaffolding post
25.1 first scaffolding post/further scaffolding post
25.2 second scaffolding post/further scaffolding post
26 tube
26.1 tube
26.2 tube
27 tube connector
27.1 tube connector
27.2 tube connector
28 longitudinal axis
28.1 longitudinal axis
28.2 longitudinal axis
29 longitudinal direction
30 first tube end
31 free/second tube end 32 (maximal) inside tube diameter
33 (maximal) outside tube diameter
34 tube support face surface
36 tube end section
37 tube mounting region
38 free/first tube connector end
39 second tube connector end
40 tube connector length
41 tube connector insertion region
42 length
43 length
44 effective tube connector length/distance
45 transition region
46 stop
46.1 stop
47 the "interior" of the tube 26
48 longitudinal inner weld seam
49 introduction cross-section narrowing
50 post set-up face surface
51 length of 49
52 radius of 49
54 outer surface of 55
55 tube end section
56 (maximal)/first outside tube connector diameter
57 (minimal) inside tube diameter
58 (outer) support surfaces of 27
59 (outer) centering surfaces of 27
60 (inner) support surfaces of 26
61 (inner) centering surfaces of 26
62 transition region/constriction/indentation
63 U-shaped or half-pear-shaped cross-section of 62
64 (minimal) outside diameter of 62
65 centering region of 27
66 centering section of 27
67 centering length of 66
68 non-indented tube section
69 distance
70 transition region
71 transition length of 70
72 support section of 27
73 support region of 27
74 support length of 72
75 second outside tube connector diameter
76 distance
77.1 passage bore
77.2 passage bore
78 inside diameter
80.1 passage bore
80.2 passage bore
81 distance
82.1 passage bore
82.2 passage bore
83.1 passage bore
83.2 passage bore
84 distance
85 distance
86 indentation/T-shaped indentation/T indentation
87 longitudinal axis of 86
88 circumferential direction
89 (tube) wall thickness
90 (longitudinal) support indentation
91 (transverse) centering indentation
92 ring section surface
93 circumference angle
94 non-indented tube section
95 circumference angle
96 circumference angle
97 circumference angle
98 length of 91
99 length of 90
100 width of 90
101 outer tube surface
102 outer tube surface of 68, 94
103 transition region
104 transition radius
105 set-up width
106 connection region
107 connection region
108 (maximal) centering gap/(maximal) centering play
108.1 half centering gap/half centering play
109 (maximal) support gap/(maximal) support play
109.1 half support gap/half support play
110 grid dimension/longitudinal distance
111 rosette/perforated disk
112 modular scaffolding
113 right scaffolding field
114 longitudinal bar
115 transverse bar
116 diagonal
117 connection head/wedge head
118 connection wedge
119 horizontal slot of 117
120 decking/scaffolding deck
121 (scaffolding) assembly frame
122 transverse bar
123 connection head
124 horizontal slot of 123
125 railing fastening device
126 holder
127 pivot lever
128 railing rod
129 vertical slot
130 assembly frame scaffolding/façade scaffolding
131 left scaffolding field
132 assembly frame/(closed) vertical frame
133 façade scaffolding
134 (U) transverse bar
135 decking
136 transverse rod
137 corner region
138 node sheet
139 corner recess
140 diagonal
141 railing fastening device/wedge box
142 insertion end of 140
143 other end of 140
144 coupling/wedge-tube coupling
145 railing rod
146 suspension hook/claw

The invention claimed is:

1. A scaffolding post made of metal and having a tube and a tube connector formed onto the tube in one piece, the tube connector being tubular,
wherein the tube and the tube connector extend in the direction of a longitudinal axis of the scaffolding post and are configured coaxial to the longitudinal axis,
wherein the tube has
a first tube end assigned to the tube connector,
a free second tube end facing away from the first tube end,
an outside tube diameter,
an inside tube diameter, and
a tube wall thickness, wherein the tube further has
  at the free second tube end a ring-shaped tube support face surface for vertical support of the scaffolding post, and
  a tube end section having a tube end section length, extending, proceeding from the ring-shaped tube support face surface, in a direction of the tube connector, and forming a tube mounting region for mounting the tube onto a tube connector of a first further scaffolding post,
wherein the tube connector has a free first tube connector end, a second tube connector end, and a tube connector length,
wherein the free first tube connector end and the second tube connector end delimit a tube connector insertion region for insertion of the tube connector into a tube of a second further scaffolding post so that the tube of the second further scaffolding post can be mounted onto the tube connector of the scaffolding post,
wherein the tube mounting region of the tube has a tube mounting region length that is essentially equal to
  a tube connector insertion region length of the tube connector insertion region of the tube connector, or
  an effective tube connector length, or
  a tube connector insertion region length of the tube connector insertion region of the tube connector and an effective tube connector length,
wherein the tube connector has an outside tube connector diameter, in the tube connector insertion region, that is smaller than an inside tube diameter of the tube spanned by the tube end section in the tube mounting region of the tube,
wherein a stop in the form of a ring-shaped post set-up face surface that runs perpendicular to the longitudinal axis of the scaffolding post and around the longitudinal axis is disposed in a transition region between the tube connector and the tube, so that the second further scaffolding post can be mounted onto the scaffolding post, all the way to the stop, in releasable manner, with a radial gap or play,
wherein the tube connector furthermore has a tube connector section disposed between the ring-shaped post set-up face surface and the free first tube connector end,
wherein the tube connector section has support surfaces for lateral support of the second further scaffolding post,
wherein the support surfaces are disposed at a support surface distance from the ring-shaped post set-up face surface, the support surface distance being equal to the effective tube connector length,
wherein the effective tube connector length either
  is essentially equal to the tube connector length, or
  is smaller than the tube connector length, by a narrowing length of an introduction cross-section narrowing disposed at the free tube connector end, the introduction cross-section narrowing being narrowed in the direction of the free first tube connector end,
wherein the tube mounting region of the tube has at least two indentations that extend in the direction of the longitudinal axis of the scaffolding post, in each instance,
wherein the at least two indentations are configured with an inside tube cross-section narrowing, in each instance, and are disposed distributed about the longitudinal axis of the scaffolding post, in a circumferential direction,
wherein the at least two indentations extend, in the tube mounting region, in each instance, directly proceeding from the ring-shaped tube support face surface, in the direction of the tube connector, continuously over an indentation length,
wherein the indentation length
  amounts to at least three times the maximal outside tube connector diameter, or amounts to
  at least 150 mm, or
  amounts to at least three times the maximal outside tube connector diameter and amounts to at least 150 mm,
wherein the at least two indentations project into the interior of the tube in the tube mounting region and have inner support surfaces for lateral support of the tube on the tube connector of the first further scaffolding post that can be inserted into the tube, and
wherein
  the at least two indentations, in each instance, are structured in L shape or T shape, with a longitudinal support indentation for lateral support on the tube connector of the first further scaffolding post that can be inserted into the tube, and with a transverse centering indentation for centering relative to the tube connector of the first further scaffolding post that can be inserted into the tube, wherein the longitudinal support indentation and the transverse centering indentation are configured with an inside tube cross-section narrowing, in each instance, wherein the transverse centering indentation extends continuously around the longitudinal axis of the scaffolding post, transverse to the longitudinal support indentation, in the circumferential direction, projecting laterally beyond the longitudinal support indentation in the circumferential direction, and wherein the transverse centering indentation is disposed at the free second tube end and delimited there by a ring section surface of the ring-shaped tube support face surface, and
  the tube connector, in the region of the ring-shaped post set-up face surface, or adjacent to the ring-shaped post set-up face surface, has a centering region that spans a first outside tube connector diameter, for centering of the tube of the second further scaffolding post that can be mounted onto the tube connector, wherein the tube connector furthermore has a support region for lateral support of the tube of the second further scaffolding post that can be mounted onto the tube connector, wherein the support region follows the centering region in the direction of the free first tube connector end, is disposed within the tube connector section, contains the support surfaces, and spans a second outside tube connector diameter, and wherein the first outside tube connector diameter is greater than the second outside tube connector diameter,
or
wherein
  the at least two indentations are structured in L shape or T shape, in each instance, with a longitudinal support indentation for lateral support on the tube connector of the first further scaffolding post that can be inserted into the tube, and with a transverse centering indentation for centering relative to the tube connector of the first further scaffolding post that can be inserted into the tube, wherein the longitudinal support indentation and the transverse centering indentation are configured with an inside tube cross-section narrowing, in each instance, wherein the transverse centering indentation extends continuously around the longitudinal axis of the scaffolding post, transverse to the longitudinal support indentation, in the circumferential direction, projecting laterally beyond the longitudinal support indentation in the circumferential direction, and wherein the transverse centering indentation is disposed at the free second tube end and delimited there by a ring section surface of the ring-shaped tube support face surface, and the tube has an essentially circular-cylindrical tube section in the region of the first tube end, the essentially circular-cylindrical tube section having an outside tube diameter that is essentially equal to the maximal outside tube diameter spanned by the tube end section, and making a transition into the ring-shaped post set-up face surface, in the direction of the free first tube connector end, directly, either essentially with a sharp edge, by way of a ring-shaped edge, or rounded at a transition radius, or wherein the tube connector, in the region of the ring-shaped post set-up face surface or adjacent to the ring-shaped post set-up face surface, has a centering region that spans a first outside tube connector diameter, for centering of the tube of the second further scaffolding post that can be mounted onto the tube connector, wherein the tube connector furthermore has a support region for lateral support of the tube of the second further scaffolding post that can be mounted onto the tube connector, wherein the support region follows the centering region in the direction of the free first tube connector end, is disposed within the tube connector section, contains the support surfaces, and spans a second outside tube connector diameter, and wherein the first outside tube connector diameter is greater than the second outside tube connector diameter, the tube has an essentially circular-cylindrical tube section in the region of the first tube end, the essentially circular-cylindrical tube section having an outside tube diameter that is essentially equal to the maximal outside tube diameter spanned by the tube end section, and in the direction of the free first tube connector end, directly, either making a transition into the ring-shaped post set-up face surface via a transition region between the ring-shaped post set-up face surface and the essentially circular-cylindrical tube section, the transition region being structured with a transition radius equal to or less than 1.5 mm, or making a transition into the ring-shaped post set-up face surface with a sharp edge, by way of a ring-shaped edge, and a ring-shaped constriction that runs around the longitudinal axis in the form of an indentation is configured between the ring-shaped post set-up face surface and the centering region of the tube connector, directly following the ring-shaped post set-up face surface, in the direction of the free first tube connector end, wherein the ring-shaped constriction spans a minimal outside diameter that is less than the first outside tube connector diameter in the centering region of the tube connector, and wherein the centering region of the tube connector directly follows the ring-shaped constriction in the direction of the free first tube connector end, or wherein the at least two indentations, in each instance, are structured in L shape or T shape, with a longitudinal support indentation for lateral support on the tube connector of the first further scaffolding post that can be inserted into the tube, and with a transverse centering indentation for centering relative to the tube connector of the first further scaffolding post that can be inserted into the tube, wherein the longitudinal support indentation and the transverse centering indentation are configured with an inside tube cross-section narrowing, in each instance, wherein the transverse centering indentation extends continuously around the longitudinal axis of the scaffolding post, transverse to the longitudinal support indentation, in the circumferential direction, projecting laterally beyond the longitudinal support indentation in the circumferential direction, and wherein the transverse centering indentation is disposed at the free second tube end and delimited there by a ring section surface of the ring-shaped tube support face surface, the tube connector, in the region of the ring-shaped post set-up face surface, or adjacent to the ring-shaped post set-up face surface, has a centering region that spans a first outside tube connector diameter, for centering of the tube of the second further scaffolding post that can be mounted onto the tube connector, wherein the tube connector furthermore has a support region for lateral support of the tube of the second further scaffolding post that can be mounted onto the tube connector, wherein the support region follows the centering region in the direction of the free first tube connector end, is disposed within the tube connector section, contains the support surfaces, and spans a second outside tube connector diameter, and wherein the first outside tube connector diameter is greater than the second outside tube connector diameter, and the tube has an essentially circular-cylindrical tube section in the region of the first tube end, the essentially circular-cylindrical tube section having an outside tube diameter that is essentially equal to the maximal outside tube diameter spanned by the tube end section, and making a transition into the ring-shaped post set-up face surface, in the direction of the free first tube connector end, directly, either essentially with a sharp edge, by way of a ring-shaped edge, or rounded at a transition radius.

2. The scaffolding post according to claim 1, wherein the transverse centering indentation or the inside tube cross-section narrowing, proceeding from the ring-shaped tube support face surface in the direction of the tube connector, extends over a length that equals a distance of at least a part of the centering region of the tube connector from the ring-shaped post set-up face surface.

3. The scaffolding post according to claim 1, wherein the transverse centering indentation or the inside tube cross-section narrowing extends, in the circumferential direction, around the longitudinal axis of the scaffolding post, over a first circumferential angle greater than the quotient of 360 degrees and twice the number of the at least two indentations, and less than the quotient of 360 degrees and the number of the at least two indentations, wherein the longitudinal support indentation or the inside tube cross-section narrowing, in the circumferential direction, extends around the longitudinal axis of the scaffolding post, over a smaller second circumferential angle, and wherein the smaller second circumferential angle is half as great or less than half as great as the first circumferential angle, or is approximately equal to the quotient of 360 degrees and three times the number of the at least two indentations.

4. The scaffolding post according to claim 1, wherein the transverse centering indentation or the inside tube cross-section narrowing is delimited by partially cylindrical inner centering surfaces.

5. The scaffolding post according to claim 1, wherein the transverse centering indentation or the inside tube cross-section narrowing projects laterally beyond the longitudinal support indentation in the circumferential direction in a circumferential region and has an essentially constant length, viewed in the longitudinal direction, essentially in the entire circumferential region.

6. The scaffolding post according to claim 1, wherein the at least two indentations are structured in T shape and are configured symmetrical to the longitudinal axis of their longitudinal support indentation, in each instance.

7. The scaffolding post according to claim 1, wherein the centering region of the tube connector is configured as an essentially cylindrical first centering section that extends in the longitudinal direction over a centering length.

8. The scaffolding post according to claim 7, wherein the support region of the tube connector is configured as an essentially cylindrical second support section that extends in the longitudinal direction over a support length, and
wherein the centering length is smaller than the support length.

9. The scaffolding post according to claim 1, wherein the tube has an essentially circular-cylindrical tube section in the region of the first tube end, the essentially circular-cylindrical tube section making a transition into the ring-shaped post set-up face surface in the direction of the free first tube connector end via a transition region, and wherein the transition region is structured with a transition radius that is equal to or less than 1.5 mm or is structured as a rounded ring edge.

10. The scaffolding post according to claim 1, wherein a ring-shaped constriction that runs around the longitudinal axis is configured between the ring-shaped post set-up face surface and the centering region of the tube connector, directly following the ring-shaped post set-up face surface in the direction of the free first tube connector end.

11. The scaffolding post according to claim 10, wherein the ring-shaped constriction spans a minimal outside diameter that is less than the first outside tube connector diameter in the centering region of the tube connector.

12. The scaffolding post according to claim 10, wherein the centering region of the tube connector directly follows the ring-shaped constriction in the direction of the free first tube connector end.

13. A scaffolding system comprising a scaffolding post according to claim 1 and a further scaffolding post, wherein the further scaffolding post is assembled to the scaffolding post.

14. The scaffolding system according to claim 13, wherein the further scaffolding post is assembled all the way to the stop of the scaffolding post
so that inner centering surfaces of transverse centering indentations or inside tube cross-section narrowings of the further scaffolding post lie directly opposite the outer centering surfaces of the centering region of the tube connector of the scaffolding post,
so that a centering gap is configured between the inner centering surfaces of the transverse centering indentations or the inside tube cross-section narrowings of the further scaffolding post and the outer centering surfaces of the centering region of the tube connector of the scaffolding post,
so that furthermore, inner support surfaces of longitudinal support indentations or inside tube cross-section narrowings of the further scaffolding post lie directly opposite the support surfaces of the support region of the tube connector of the scaffolding post, and
so that a support gap is configured between the inner support surfaces of the longitudinal support indentations or the inside tube cross-section narrowings of the further scaffolding post and the support surfaces of the support region of the tube connector of the scaffolding post, the support gap being greater than the centering gap.

15. The scaffolding system according to claim 13, wherein the further scaffolding post has a tube connector and a tube, wherein the tube and the tube connector of the further scaffolding post extend in the direction of a further scaffolding post longitudinal axis of the further scaffolding post, in each instance, and are disposed coaxial to the further scaffolding post longitudinal axis, wherein a stop for setting up a scaffolding post is configured between the tube connector and the tube of the further scaffolding post, wherein the tube of the further scaffolding post has a first outside diameter, wherein the tube connector of the further scaffolding post has a second outside diameter, and wherein the first outside diameter is greater than the second outside diameter.

16. The scaffolding system according to claim 13, wherein the scaffolding post is assembled all the way to a stop of the further scaffolding post
so that the outer centering surfaces of the centering region of the tube connector of the scaffolding post lie directly opposite inner centering surfaces of a tube mounting region of the further scaffolding post,
so that a centering gap is configured between the outer centering surfaces of the centering region of the tube connector of the scaffolding post and the inner centering surfaces of the tube mounting region of the further scaffolding post,
so that the support surfaces of the support region of the tube connector of the scaffolding post lie directly opposite inner support surfaces of the tube mounting region of the further scaffolding post, and
so that a support gap is configured between the support surfaces of the support region of the tube connector of the scaffolding post and the inner support surfaces of the tube mounting region of the further scaffolding post, the support gap being slightly greater than the centering gap.

17. A scaffolding device comprising a scaffolding post according to claim 1, wherein the scaffolding device is at least one member selected from the group consisting of: a scaffolding frame, a scaffolding, a modular scaffolding, and a frame scaffolding, and wherein the scaffolding post is an integral part of the at least one member.

18. The scaffolding post according to claim 1, wherein the longitudinal support indentation or the inside tube cross-section narrowing is delimited with partially cylindrical inner support surfaces.

19. The scaffolding post according to claim 1, wherein the longitudinal support indentation or the inside tube cross-section narrowing has an entire length and an essentially constant width, viewed in the circumferential direction, essentially over the entire length.

20. The scaffolding post according to claim 1, wherein the support region of the tube connector is configured as an essentially cylindrical support section that extends in the longitudinal direction over a support length.

\* \* \* \* \*